(12) United States Patent
Ohkawa et al.

(10) Patent No.: US 6,840,452 B2
(45) Date of Patent: Jan. 11, 2005

(54) LIGHT SOURCE MODULE FOR A SCANNING APPARATUS AND A SCANNING APPARATUS WITH THE LIGHT SOURCE MODULE

(75) Inventors: Masanori Ohkawa, Kawasaki (JP); Toshiyuki Ichikawa, Kawasaki (JP); Hiroshi Watanuk, Kawasaki (JP); Kozo Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 153 days.

(21) Appl. No.: 09/854,689

(22) Filed: May 15, 2001

(65) Prior Publication Data

US 2001/0023894 A1 Sep. 27, 2001

Related U.S. Application Data

(62) Division of application No. 09/084,954, filed on May 28, 1998, now Pat. No. 6,283,373.

(30) Foreign Application Priority Data

Sep. 30, 1997 (JP) .............................................. 9-264741

(51) Int. Cl.[7] ................................................ G06K 7/10
(52) U.S. Cl. ............................... 235/462.36; 235/462.42
(58) Field of Search ....................... 235/462.36, 462.37, 235/462.38, 462.39, 462.4, 462.42

(56) References Cited

U.S. PATENT DOCUMENTS

| | | | |
|---|---|---|---|
| 4,926,433 A | 5/1990 | Umamura et al. | |
| 5,015,831 A | 5/1991 | Eastman et al. | |
| 5,115,120 A | 5/1992 | Eastman | |
| 5,202,817 A | 4/1993 | Koenck et al. | |
| 5,218,188 A | 6/1993 | Hanson | |
| 5,254,844 A | 10/1993 | Krichever et al. | |
| 5,337,072 A | 8/1994 | Gentzke et al. | |
| 5,392,150 A | 2/1995 | Inagaki et al. | |
| 5,629,510 A | 5/1997 | Quinn et al. | |
| 5,689,102 A * | 11/1997 | Schonenberg et al. . | 235/462.38 |
| 5,726,813 A * | 3/1998 | Katoh et al. .............. | 359/809 |
| 5,872,354 A | 2/1999 | Hanson | |
| 5,900,617 A | 5/1999 | Dvorris et al. | |
| 5,920,061 A | 7/1999 | Feng et al. | |
| 6,283,373 B1 * | 9/2001 | Ohkawa et al. ........ | 235/462.43 |

FOREIGN PATENT DOCUMENTS

| | | |
|---|---|---|
| GB | 2 287 577 | 9/1995 |
| JP | 6-45706 | 2/1994 |
| JP | 6-045706 | 2/1994 |
| JP | 7-134259 | 5/1995 |
| JP | 8-248285 | 3/1996 |
| JP | 8-211317 | 8/1996 |
| JP | 8-236873 | 9/1996 |

* cited by examiner

*Primary Examiner*—Karl D. Frech
(74) *Attorney, Agent, or Firm*—Staas & Halsey LLP

(57) ABSTRACT

A light source module has a laser diode, and a circuit board. The circuit board includes the laser diode, a driver circuit for the laser diode, and a connector for receiving a power supply for driving the laser diode from an electric power source. A lens and an aperture shapes the laser beam emitted from the laser diode. A housing made of electrical insulating material contains the lens, the aperture and the circuit board except for a portion of the circuit board where the connector is mounted.

10 Claims, 30 Drawing Sheets

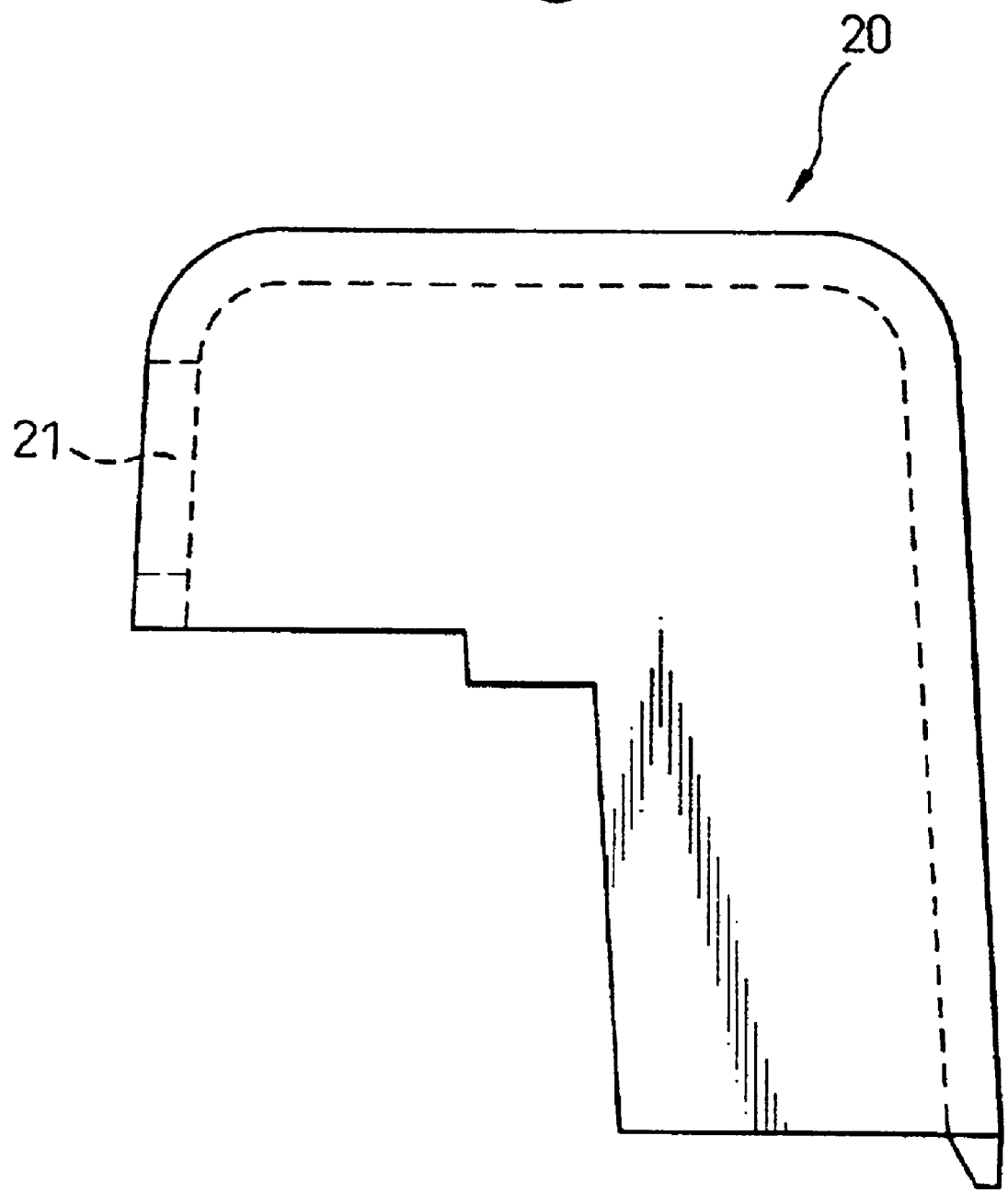

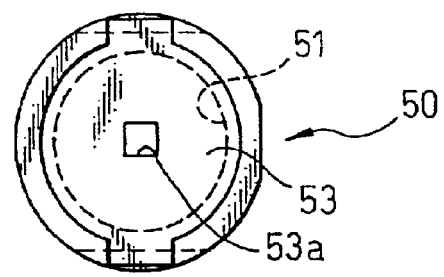
Fig. 14A
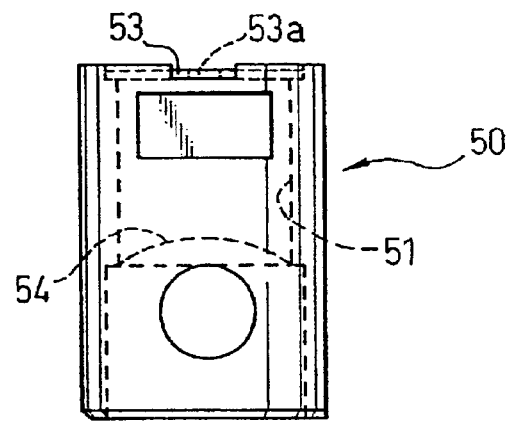
Fig. 14B
Fig. 15
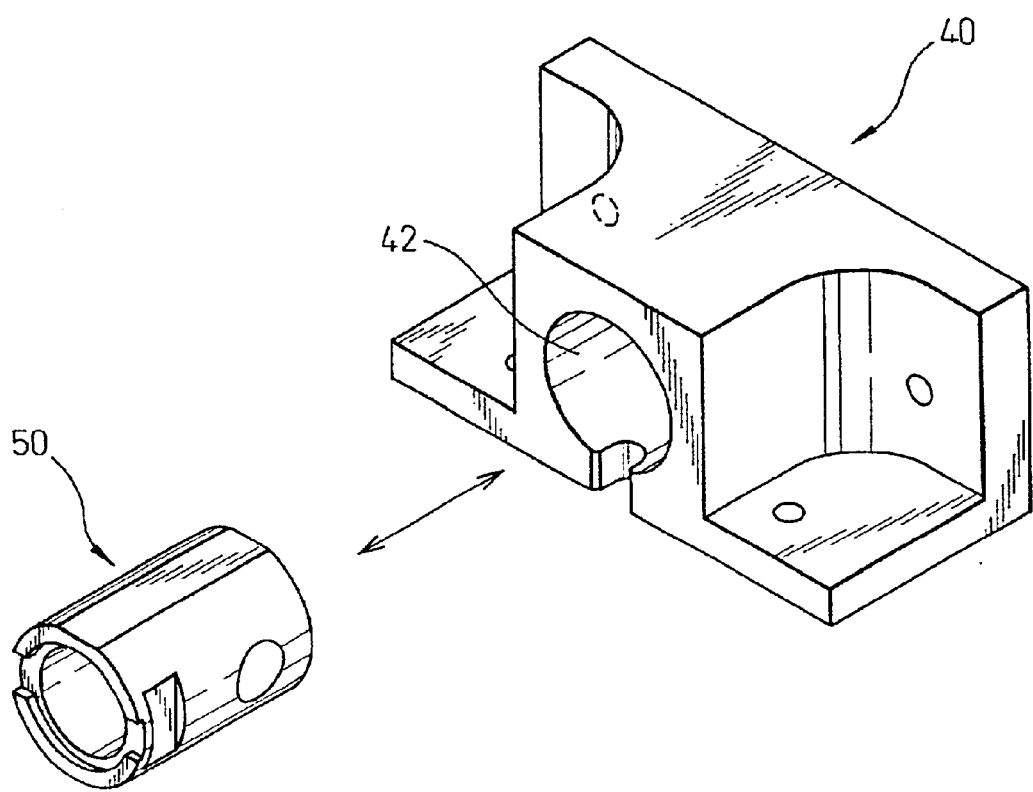

LIGHT SOURCE MODULE FOR A SCANNING APPARATUS AND A SCANNING APPARATUS WITH THE LIGHT SOURCE MODULE

This application is a divisional of application Ser. No. 09/084,954, filed May 28, 1998, now U.S. Pat. No. 6,283,373.

BACKGROUND OF THE INVENTION

1. Field of the Invention

The invention relates to a light source module for a scanning apparatus such as a bar code reader, and to a scanning apparatus with the light source module.

2. Description of the Related Art

Recently, point-of-sale systems (POS systems) have become common in stores. In a POS system, a bar code reader reads a bar code provided on an article. According to the POS system, check-out work is carried out only by scanning a beam emitted from a bar code reader. Thus, the work of an operator (salesclerk) is reduced by using a bar code reader.

A bar code reader generally includes a light source for emitting a beam, an arrangement for generating a scanning beam by reflecting the beam from the light source, such as a rotating polygon mirror, a plurality of mirrors for reflecting the scanning beam and for dividing the scanning beam to provide a set of scanning lines outside of the bar code reader. The return beams reflected by a bar code on an article are condensed by a concave mirror or a condenser lens onto a light receiving device, such as a photodiode which generates an electrical signal corresponding to the return beams received by the light receiving device. These elements are sealingly contained within a housing to provide an optical unit.

Such an apparatus for reading a bar code is a kind of a scanner apparatus, similar to a scanner device in a laser printer or a copy machine, and is often referred to as a POS scanner or a bar code scanner. A laser diode is often used as a light source because of its compactness, low power consumption, and cost while a gas laser beam (for example, He—Ne laser beam) was originally used.

A laser diode has a problem that its life is shorter than a gas laser so that a bar code reader with a laser diode must be designed and used while considering replacement of the light source. Further, there is a problem that static electricity may damage a semiconductor laser.

In the prior art, a light source is provided by a VLD (Visible Laser Diode) module which includes a laser beam source, a lens and an aperture for shaping a beam.

When replacing a laser diode, the VLD module is replaced with the laser diode. In the prior art, the VLD module is contained within the housing of the optical unit. Thus, the housing of the optical unit must be opened to replace the VLD module. This work must be carried out in a clean room to prevent dust, which may harmfully effect to the optical characteristics of the scanner, from entering the optical unit. There is also a problem that the bar code reader to be mended cannot be used during the replacement of the VLD module.

SUMMARY OF THE INVENTION

The invention is directed to solve the above mentioned problems in the prior art and an the objective of the invention is to provide a light source module or a VLD module for a scanner apparatus, such as a bar code reader, or a scanning device in a laser printer or a copy machine, which is improved so that light source module can be replaced, without dust entering the optical unit of the scanner apparatus, wherever the scanner apparatus is used.

Another objective of the invention is to provide a light source module which is improved so that the effect of an static electricity on the laser diode is eliminated or reduced.

Another objective of the invention is to provide a scanner apparatus, such as a bar code reader, or a scanning device in a laser printer or a copy machine, which includes the light source module.

In order to achieve the objective, the invention provides a light source module which has a laser diode and a circuit board. The circuit board includes the laser diode, a driver circuit for the laser diode, and a connector for receiving a power supply for driving the laser diode from an electric power source. A lens and an aperture shapes the laser beam emitted by the laser diode. A housing made of electrically insulating material for contains the lens, the aperture and the circuit board except for a portion of the circuit board where the connector is mounted.

The light source module facilitates the replace thereof. The light source module further has an advantage that is removes or reduces the possibility of damage to the laser diode by static electricity since an operator can replace the light source module without touching the laser diode.

According to another feature of the invention, there is provided a scanning apparatus which comprises:

a light source module;

an optical unit including a housing in which means for receiving a beam from the light source module and reflecting the beam to provide the scanning beam, means for reflecting the scanning beam to provide a plurality of scanning lines outside of the housing, and means for receiving a return beam reflected by an article are sealingly contained; and the housing including an arrangement for mounting the light source module outside of the housing and an aperture through which the beam can enter the housing.

According to another feature of the invention, a scanner for emitting a scanning beam is provided. The scanner comprises:

a light source for emitting a light beam;

an optical unit including an optical element for receiving the light beam form the light source and for producing a scanning beam, and a housing for enclosing the optical element, the housing including an aperture through which the light beam enters the housing; and the light source being mounted to the exterior of the housing of the optical unit to direct the beam to the optical elements within the housing through the aperture.

According to an embodiment of the invention, the optical unit preferably includes a scanning mirror for producing a scanning beam, a plurality of mirrors for reflecting the scanning beam and for dividing the scanning beam into first and second sets of scanning beam segments, an optical receiver element for receiving the return beam reflected by a bar code to produce an electrical signal responsive to the return beam, and a housing for enclosing the scanning mirror, the plurality of mirrors, and the optical receiver element, the housing including an aperture, and first and second openings through which the first and second sets of scanning beam segments propagate outside of the housing to provide fist and second sets of scanning lines outside of the scanner. The light source is secured to the exterior of the housing to direct the light beam to the scanning mirror through the aperture provided in the housing.

According to another feature of the invention, a bar code scanner for reading a bar code is provided. The bar code scanner comprises:

a light source for emitting a light beam;

an optical unit including a scanning mirror for producing a scanning beam, a plurality of mirrors for reflecting the scanning beam and for dividing the scanning beam into first and second sets of scanning beam segments, an optical receiver element for receiving the return beam reflected by a bar code to produce an electrical signal responsive to the return beam, and a housing for enclosing the scanning mirror, the plurality of mirrors, and the optical receiver element, the housing including an aperture, and first and second openings through which the first and second sets of scanning beam segments propagate outside of the housing to provide fist and second sets of scanning lines outside of the scanner. The light source is secured to the exterior of the housing to direct the light beam to the scanning mirror through the aperture provided in the housing.

According to yet another feature of the invention, a bar code scanner for reading a bar code is provided. The bar code scanner comprises:

a light source for emitting a light beam;

an optical unit including a scanning mirror for producing a scanning beam, a plurality of mirrors for reflecting the scanning beam and for dividing the scanning beam into a set of scanning beam segments, an optical receiver element for receiving the return beam reflected by a bar code to produce an electrical signal responsive to the return beam, and a housing for enclosing the scanning mirror, the plurality of mirrors, and the optical receiver element, the housing including an aperture, and an openings through which the set of scanning beam segments propagate outside of the housing to provide a set of scanning lines outside of the scanner. The light source being secured to the exterior of the housing to direct the light beam to the scanning mirror through the aperture provided in the housing.

DESCRIPTION OF THE DRAWINGS

These and other objects and advantages, and a further description, will now be discussed in connection with the drawings in which:

FIG. 4 is a side view of the housing of FIG. 3;

FIGS. 14A and 14B are bottom and side views of the lens holder;

FIG. 15 is a perspective view of the mount and the lens holder, illustrating the assembling thereof;

DESCRIPTION OF THE PREFERRED EMBODIMENTS

With reference to the drawings, the preferred embodiment of the invention will be described. In the following description, the invention is applied to a bar code reader. However, the invention is not limited to the bar code reader and can be applied to a scanner device in a laser printer or a copy machine, etc.

Figure 1:
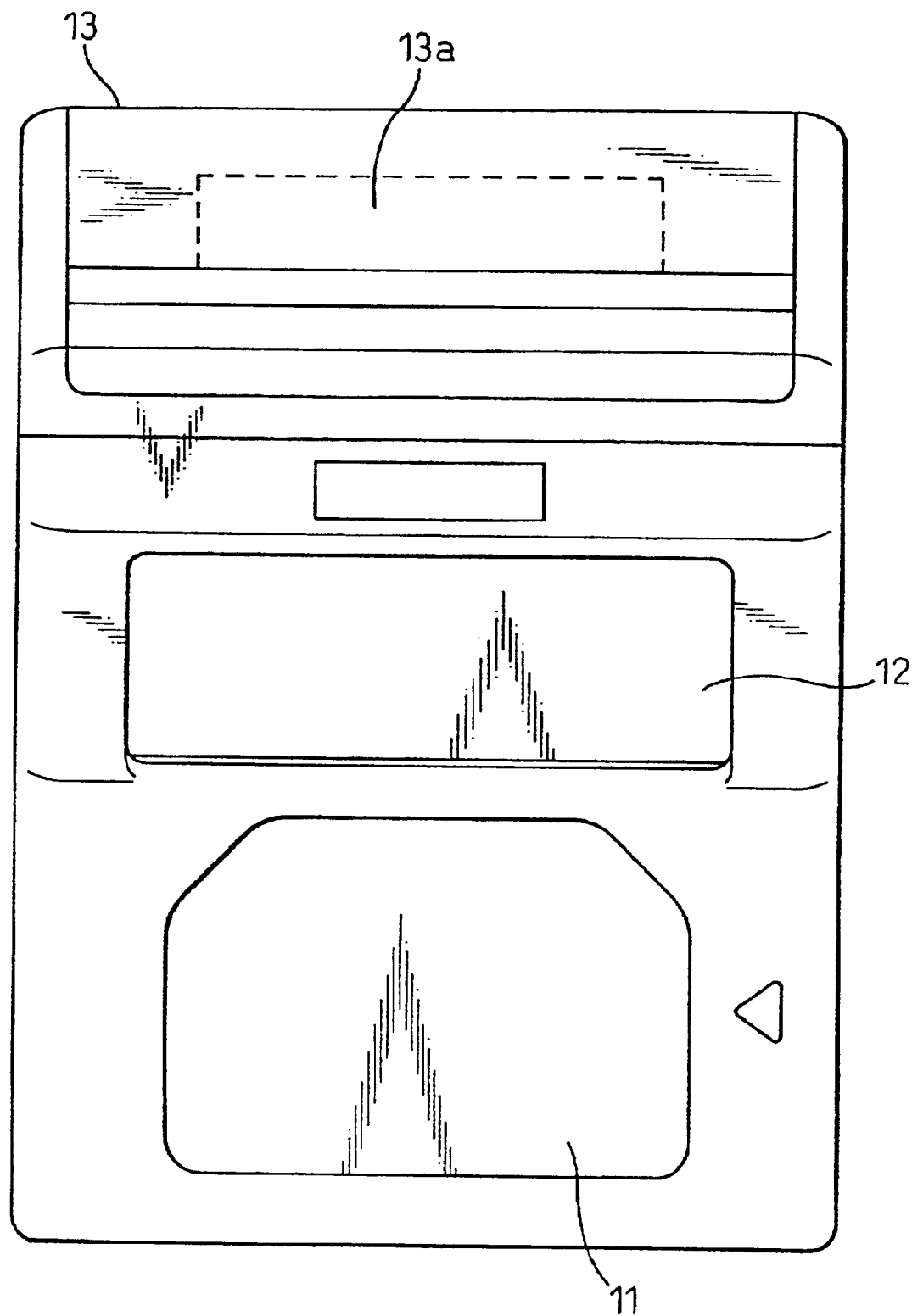
FIG. 1 is a front view of a bar code reader to which the invention is applied.
Figure 2:
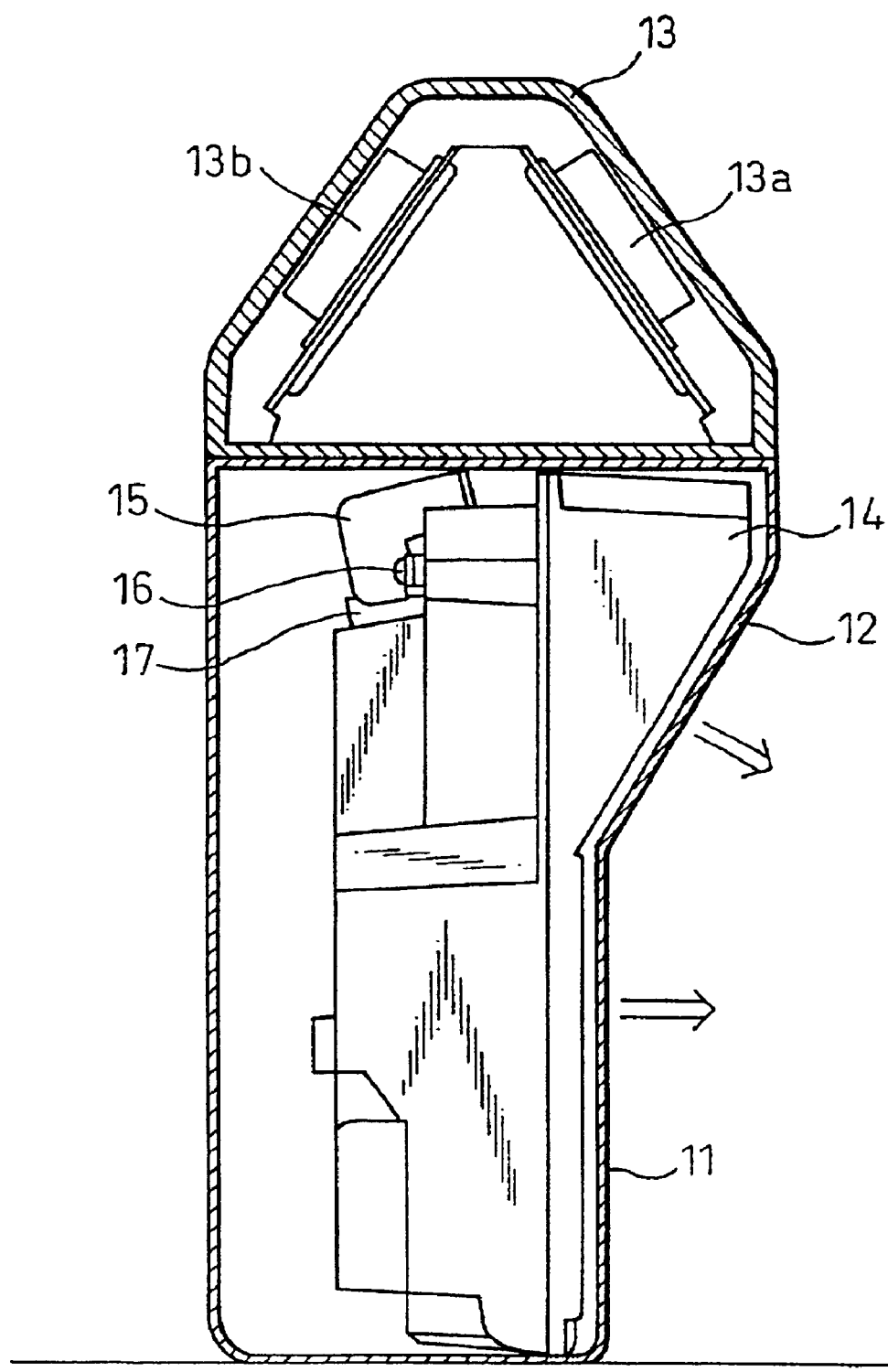
FIG. 2 is a side section of the bar code reader of FIG. 1.
Figure 3:
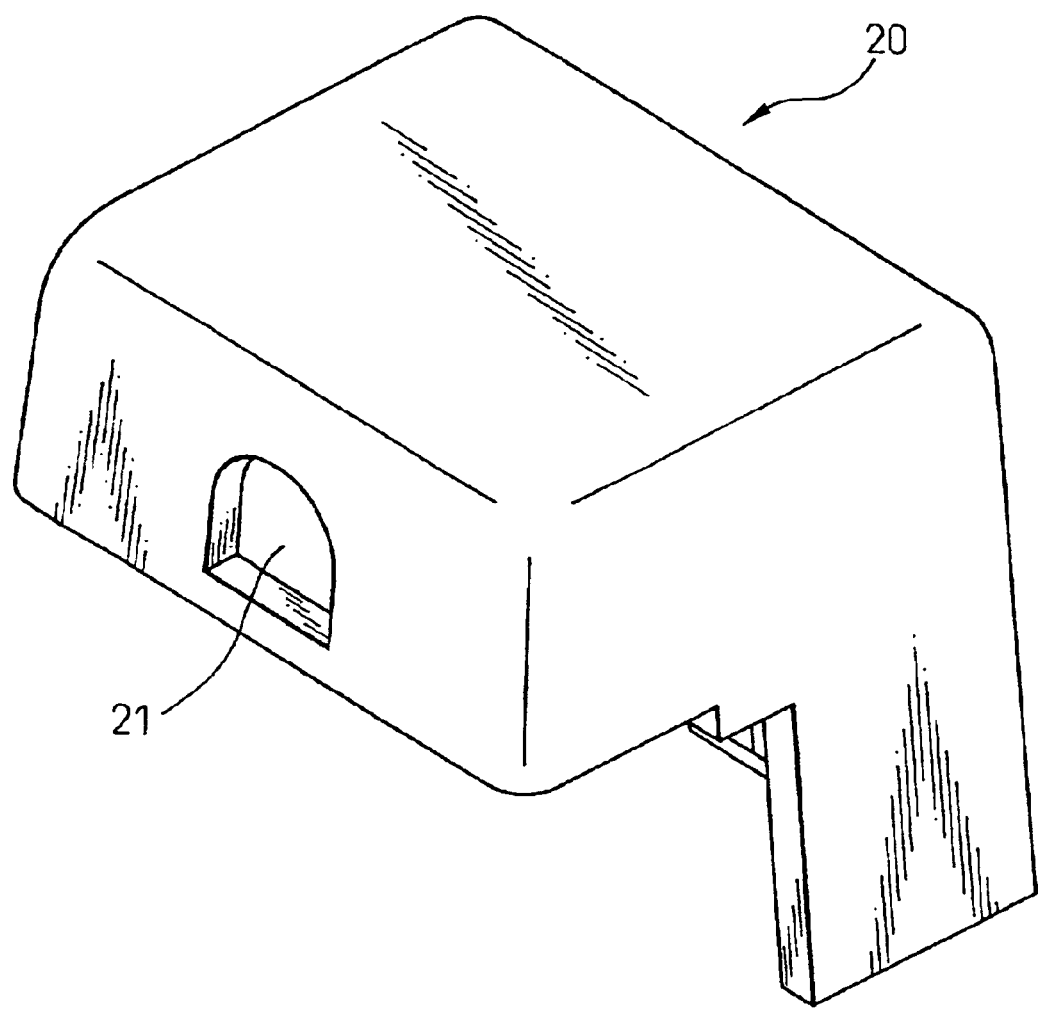
FIG. 3 is a perspective view of a housing of a VLD module according to the present invention.
Figure 5A:
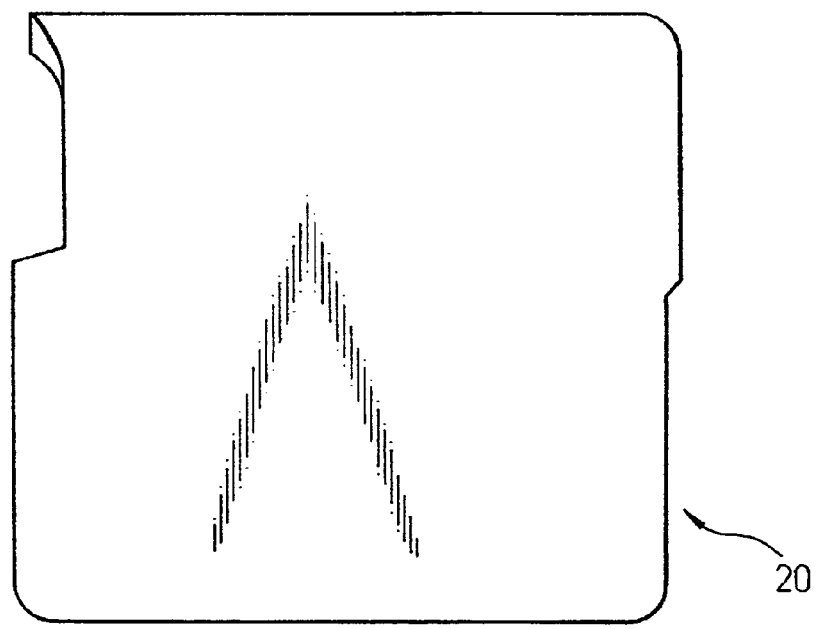
FIGS. 5A and 5B are top and bottom views of the housing of FIG. 3, respectively.
Figure 5B:
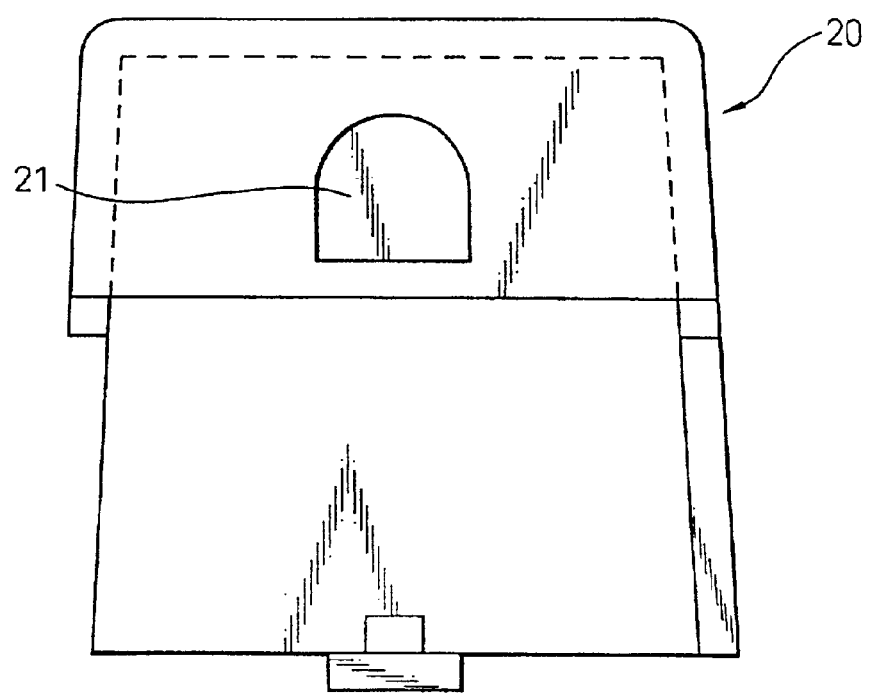
Figure 6A:
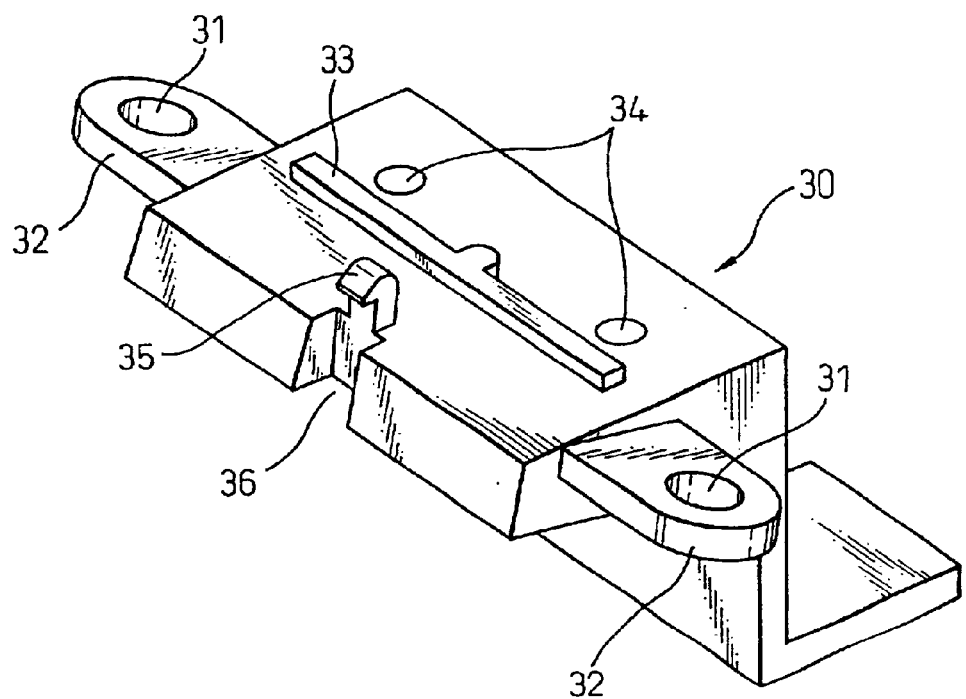
FIGS. 6A and 6B are perspective and side view of a cover of the VLD module.
Figure 6B:
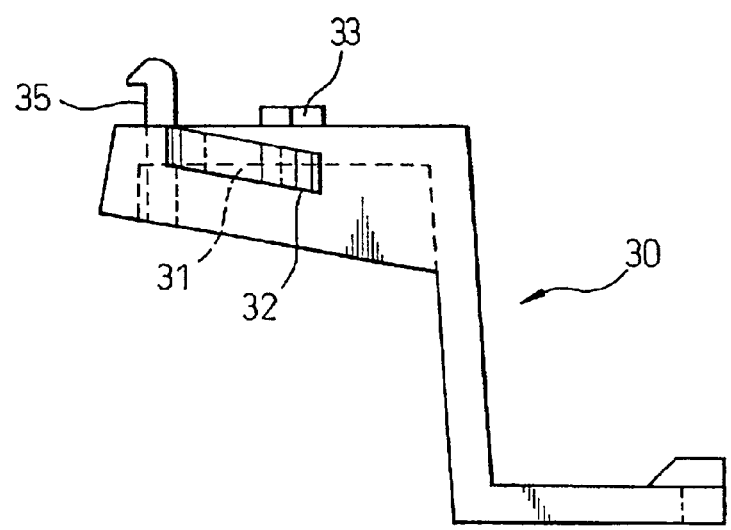
Figure 7:
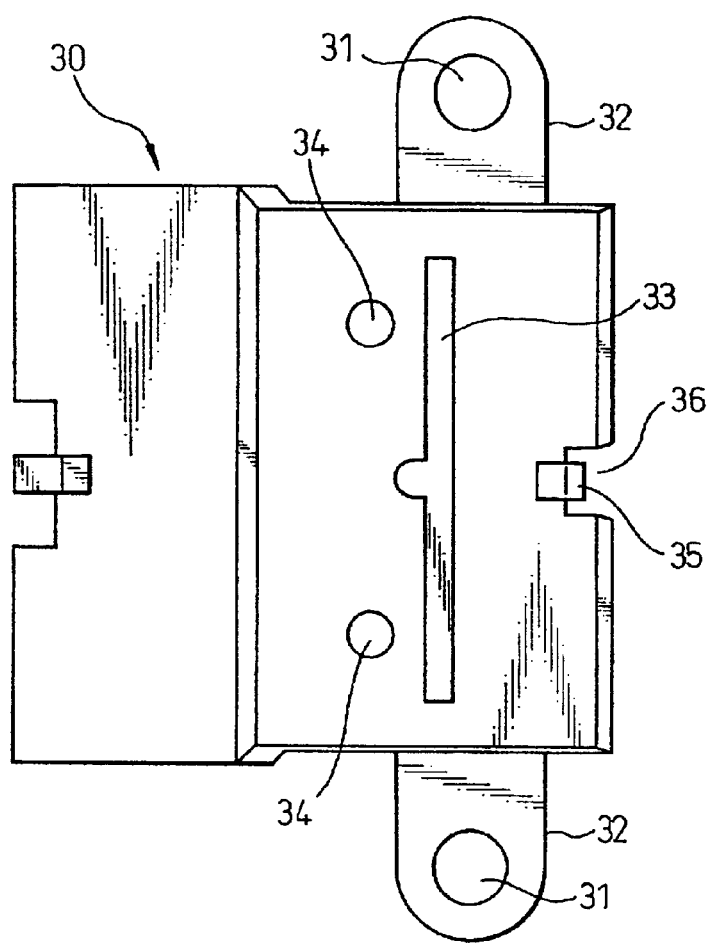
FIG. 7 is a side view of the cover of FIG. 6A.
Figure 8:
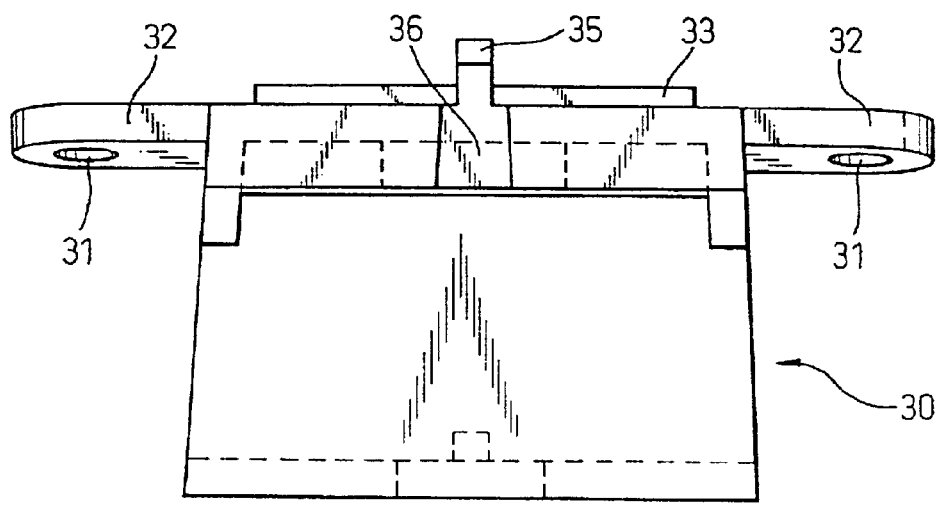
FIG. 8 is a bottom view of the cover of FIG. 6A.

FIG. 1 is a front view of a bar code scanner to which the invention is applied. FIG. 2 is a side section showing the internal arrangement of the bar code scanner.

The bar code scanner is of an upright type and is mounted to a top surface 10 of a table such as a cashier counter. The housing of the scanner includes first and second openings 11 and 12 through which first and second scanning beams propagate outside of the housing, respectively. The first opening is perpendicular to the top surface 10. The first scanning beam horizontally propagates through the first opening 11 while the second scanning beam propagates obliquely downwardly through the second opening 12. The first and second beams intersect in front of the first opening 11.

A bar code (not shown) on an article (not shown) is irradiated by at least one of the first and second beams when the bar code passes the reading area where the first and second beams intersect in front of the bar code reader. A bar code reader with a single opening cannot read a bar code if an operator does not orient the bar code to the window accurately. On the other hand, in the bar code reader of the present invention, the provision of two sets of openings and beams enables the scanner to read the bar code if an operator does not orient the bar code to the first or second opening accurately.

A display 13, for indicating the name and the price corresponding to a bar code and the total of the purchase, is provided to the top of the scanner. The display 13 includes first and second indicators 13a and 13b, respectively. The first and second indicators 13a and 13b are oriented to the operator of the scanner and the customer. The first and second indicators 13a and 13b may indicate the same information.

The scanner further includes an optical unit 14 and a VLD (Visible Laser Diode) module 15, as a light source module. The VLD module 15 is mounted outside of the optical unit 14 by screws 16 (only one of which is shown in the drawings). A buffer or a damper 17 of a resilient material, such as a rubber or a urethane, is provided between the VLD module 15 and the optical unit 14.

Figure 23:
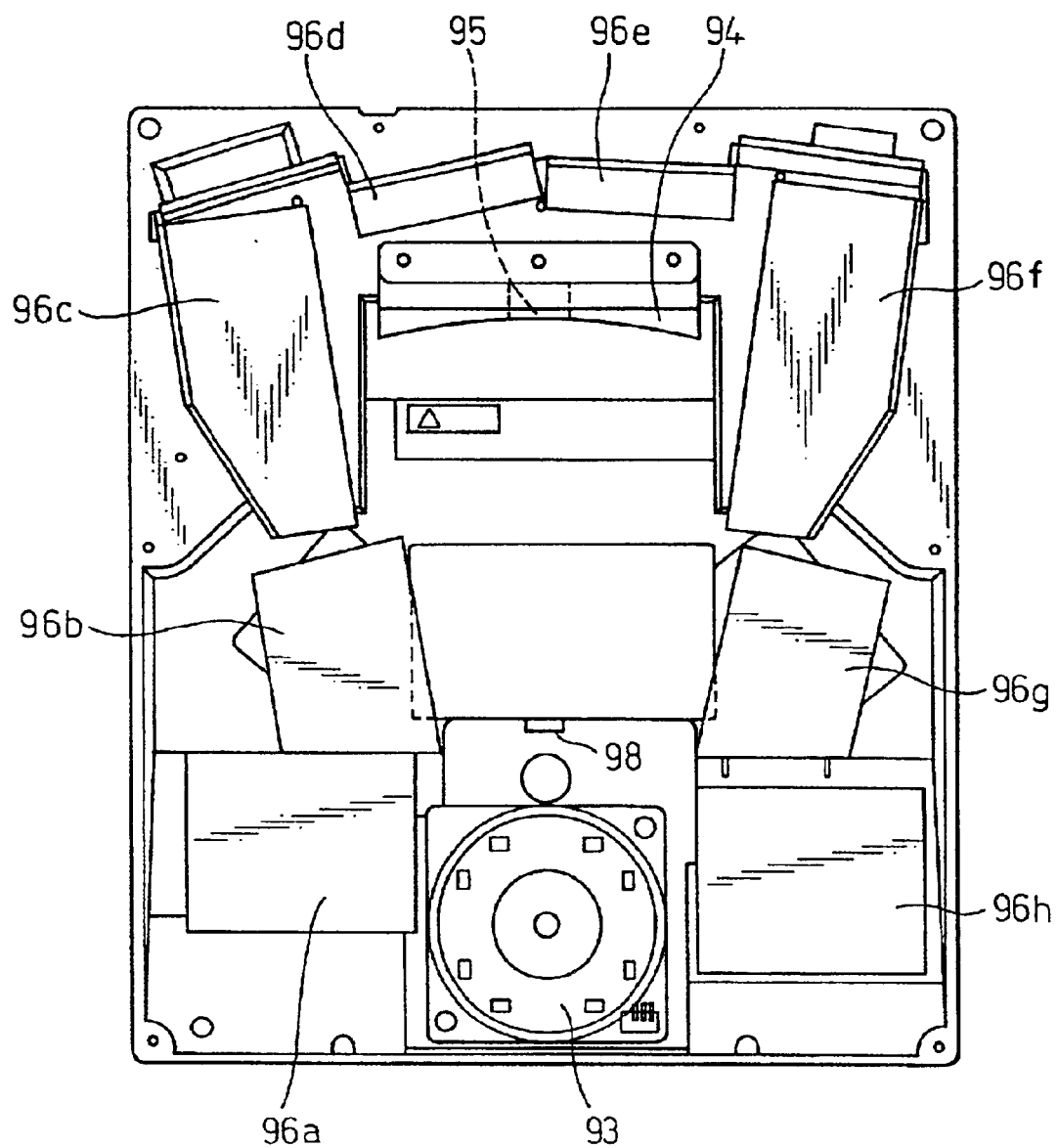
FIG. 23 is an interior elevation of the optical unit of FIG. 19.

With reference to FIG. 23, within the optical unit 14, a polygon mirror 93, a plurality of mirrors 96a to 96h for providing a set of scanning lines outside of the scanner by reflecting the scanning beam from the polygon mirror 93, and a concave mirror 94 for condensing the reflected beam from the bar code to an optical receiver 98 such as a photodiode are provided.

Figure 20:
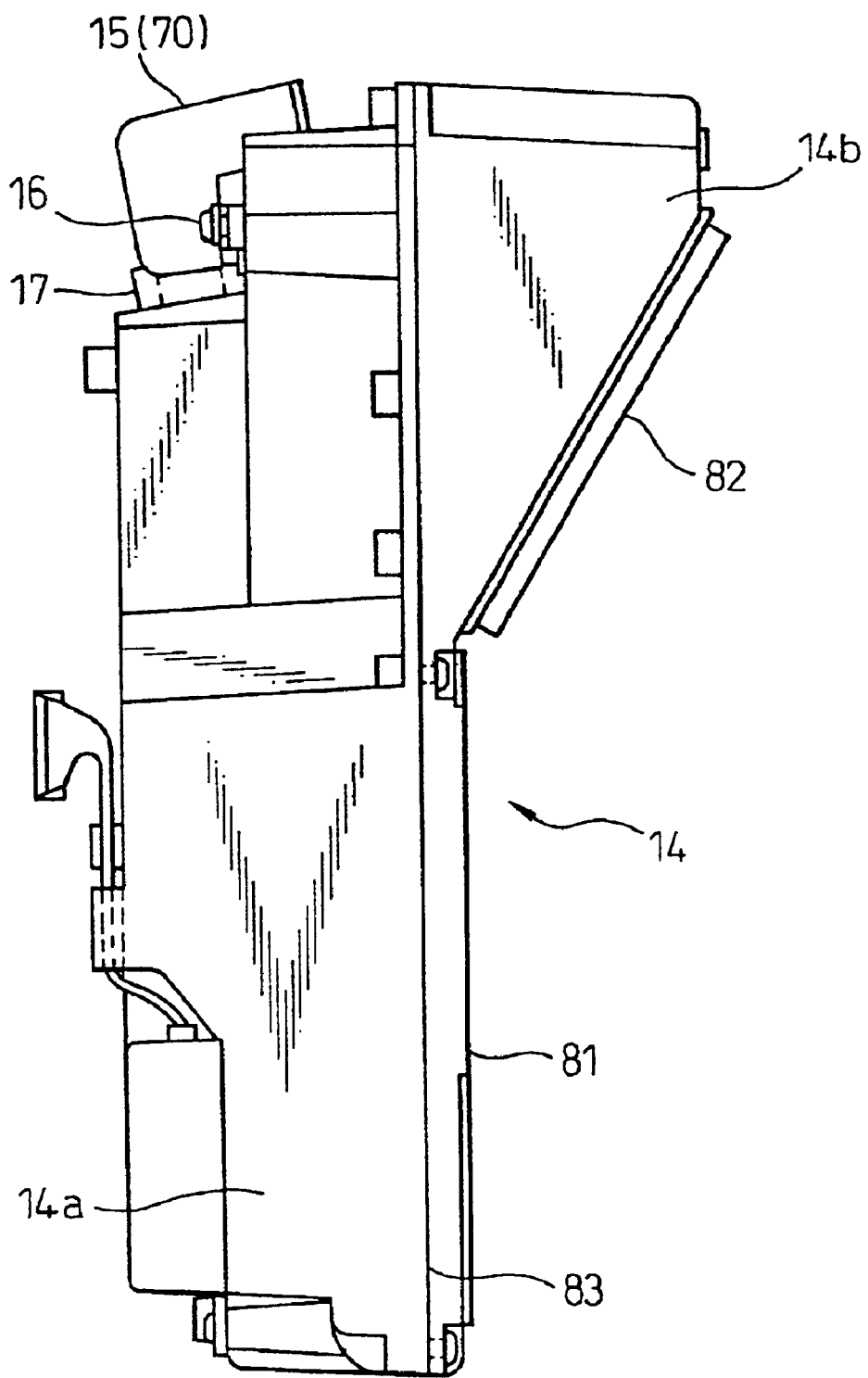
FIG. 20 is a side view of the optical unit of FIG. 19.

The VLD module 15 includes a housing portion 20 shown in FIGS. 3 to 5B, and a cover 30 shown in FIGS. 6A to 8, both of which are made of molded resin. The housing portion 20 includes an aperture 21 through which a laser beam is emitted from a laser diode contained in the housing 20 and 30 to the polygon mirror 93 as described hereinafter. It should be noted that although the housing portion 20 is shown in FIGS. 3, 4, 5 and 9, so that the aperture 21 is laterally oriented, the VLD module 15 attached to the optical unit 14 so that the aperture 21 is oriented to the bottom of the unit 14 as shown in FIG. 20. In this specification, "top" and "bottom" are defined as the orientation shown in the drawings.

The cover 30 comprises a base 31, and a pair of mounting members 32 extending from the sides of the base 31. The base 31 includes a ridged portion 33 on the base 31, a pair of through holes 34, a cutout 36 for positioning the VLD module to the optical unit 14, and a hook 35 adjacent to the cutout 36. Each of the mounting members 32 includes a through hole 32a into which a screw 16 (FIG. 2) is inserted to secure the VLD module to the optical unit 14.

Figure 9:
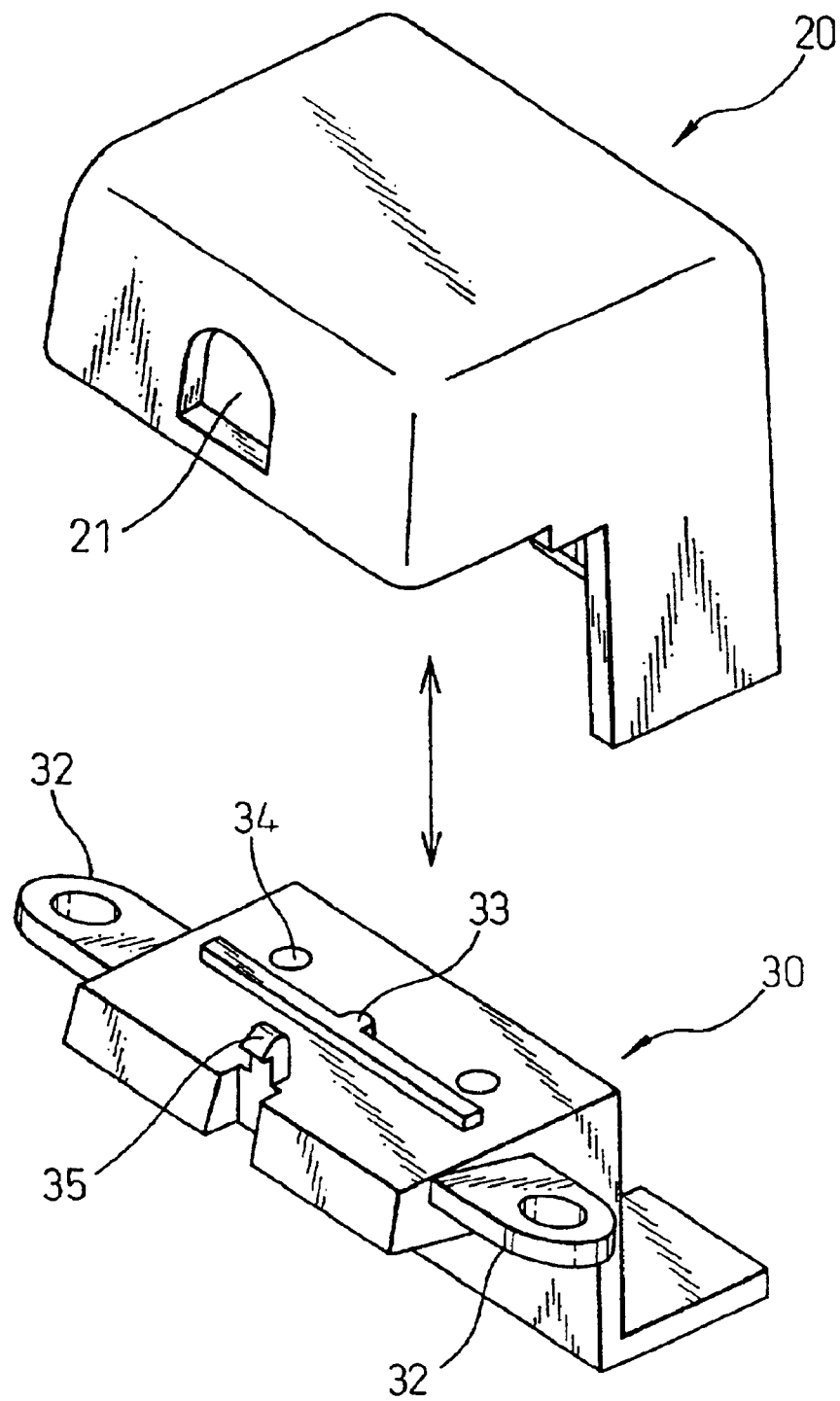
FIG. 9 is a perspective view of the housing and cover illustrating the assembling thereof.

The cover 30 is connected to the housing portion 20 to close the opening of the housing portion 20, as shown in FIG. 9, to provide a housing of the VLD module 15.

Figure 10:
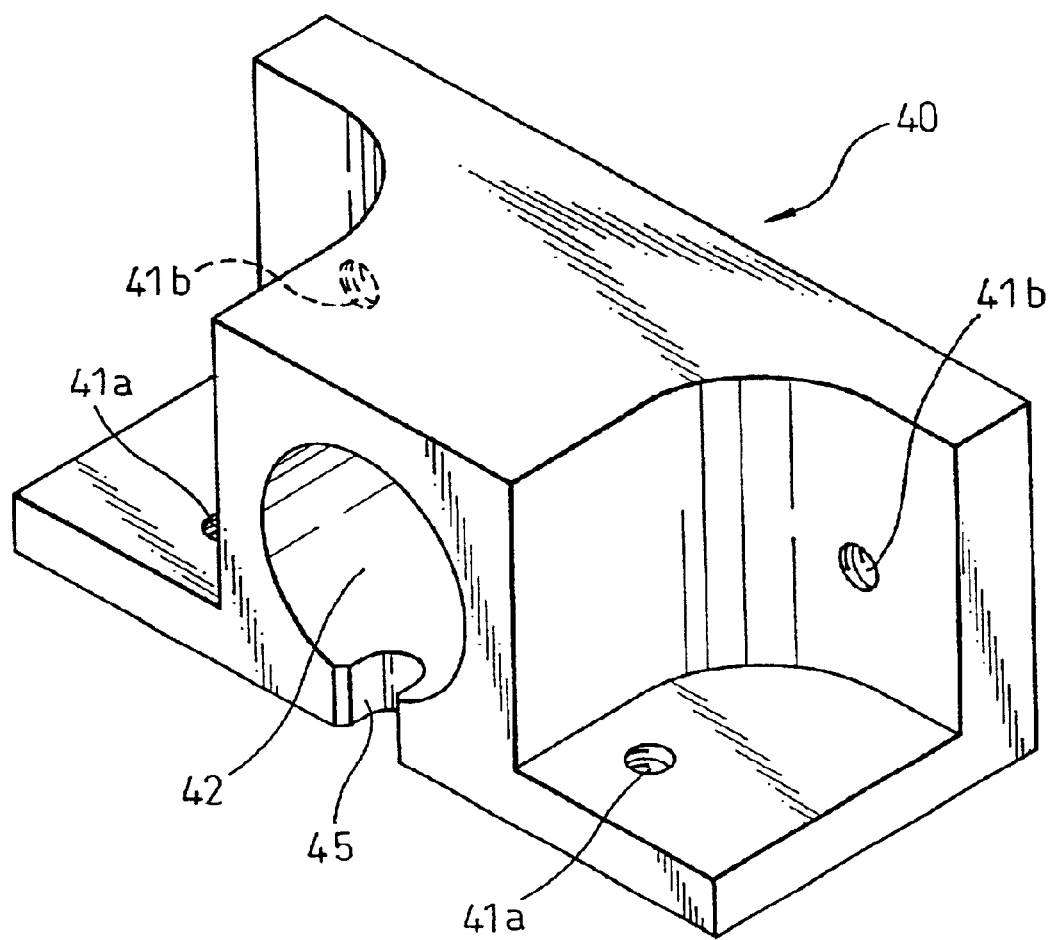
FIG. 10 is a perspective view of the bottom a mount of the VLD module to which a lens and an aperture are mounted.
Figure 11A:
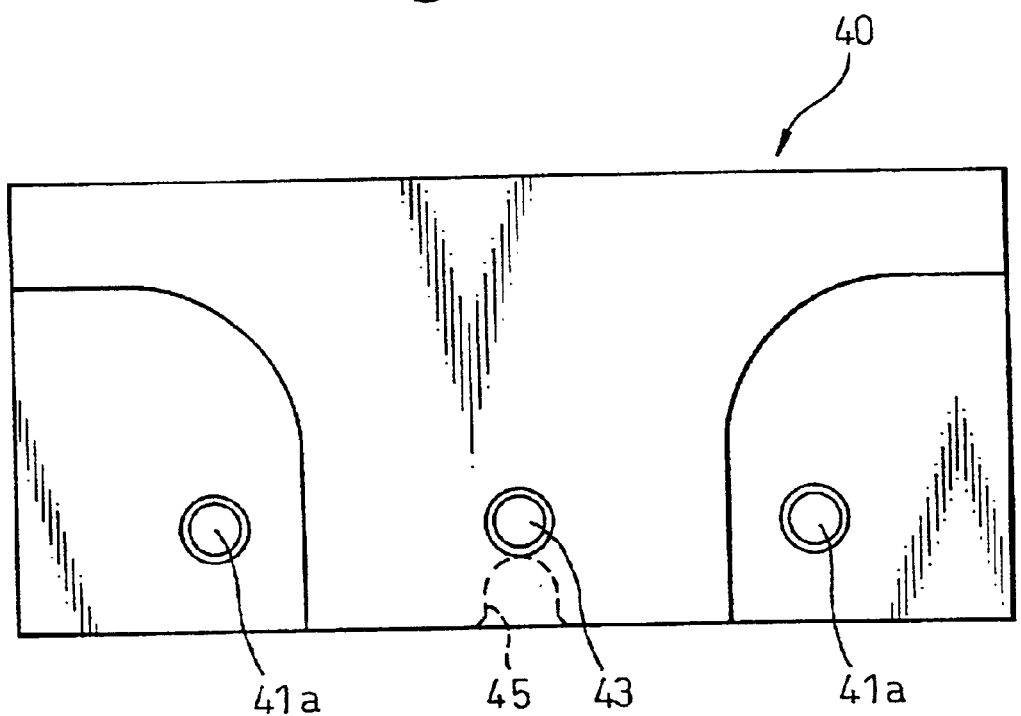
FIGS. 11A and 11B are front and bottom views of the mount of FIG. 10.
Figure 11B:
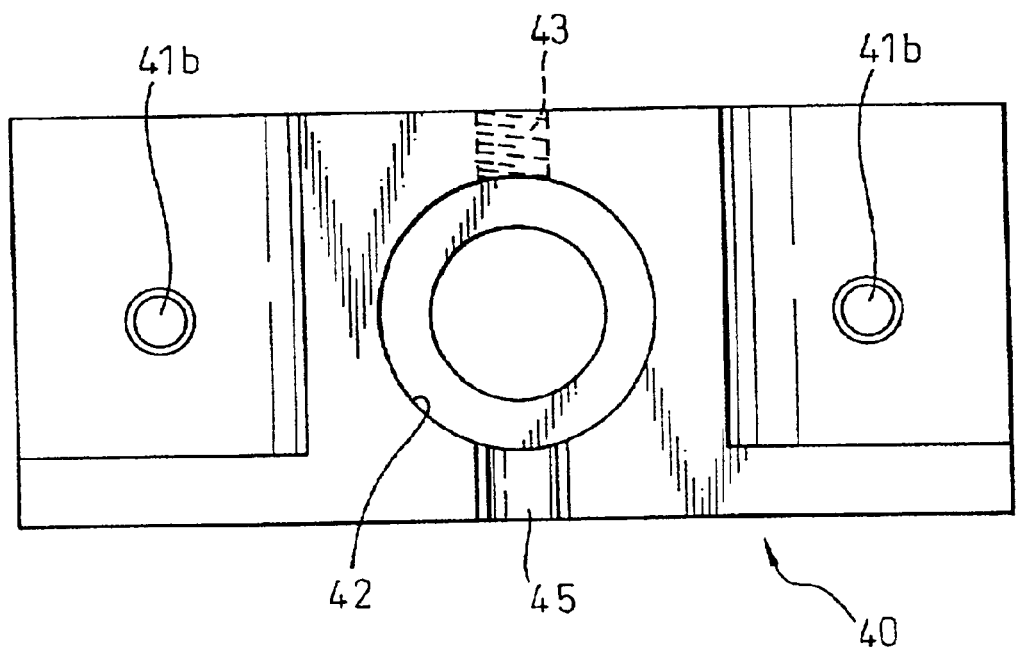
Figure 12:
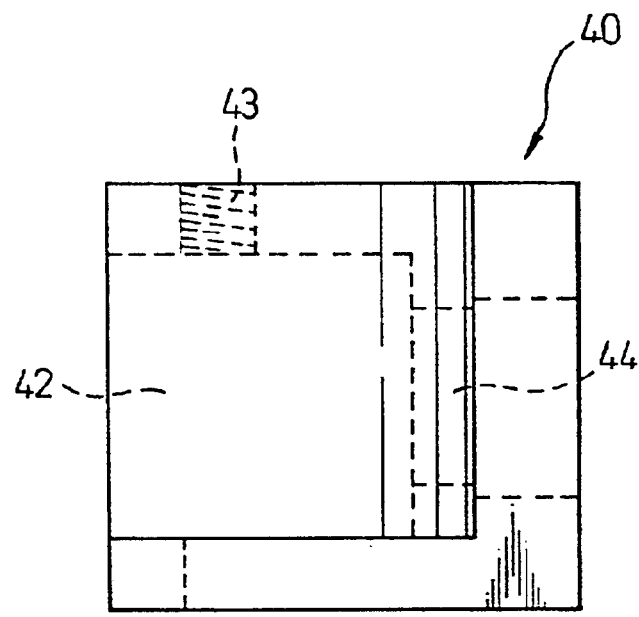
FIG. 12 is a side view of the mount.

Shown in FIGS. 10 to 12 is a mount 40 for securing the laser beam source inside of the housing of the VLD module. The mount 40 includes two pairs of threaded holes 41a and 41b and a recess 45 adapted to fit the ridged portion 33 on the top surface of the base 31 of the cover 30, and may be made of die cast aluminum. The threaded holes 41a receive screws 71 (FIG. 18) which are inserted into the through holes 34 of the cover 30 to secure the mount 40 to the base 31 of the cover 30. The threaded holes 41b receive screws 63 (FIGS. 16A and 16B) to secure a printed circuit board as mentioned hereinafter.

Figure 13:
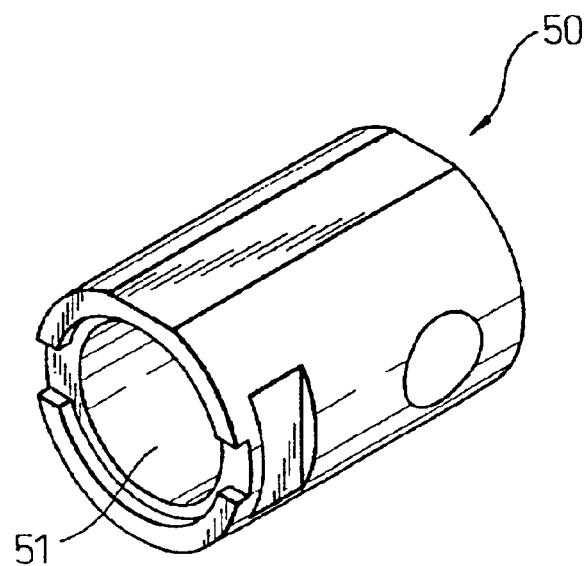
FIG. 13 is a perspective view of a lens holder of the VLD module.

The mount 40 further includes a bore 42 into which a lens holder 50 (FIGS. 13 to 15) is fitted, and a threaded hole 43 into which a screw 64 (FIGS. 16A and 16C) is threaded to lock the lens holder 50. The lens holder 50 is shaped in the form of a cylinder which includes a bore 51 and a flattened portion 52 to which the tip of the screw 64 abuts to lock the holder 50.

The lens holder 50 holds an aperture plate 53 which includes an aperture 53a and a lens 54 which is fixed to the inside of the bore 51 (FIGS. 14A and 14B). The aperture 53a shapes the beam to provide a desirable beam section. The configuration of the aperture 53a can be selected according to the desirable section of the laser beam while the aperture 53a has a rectangular configuration in the embodiment shown in FIGS. 14A and 14B. The lens 54 adjusts the focal point of the beam. The aperture plate 53 and the lens 54 adjust the diameter of the laser beam.

The lens holder 50 is slidably fitted into the bore 42 of the mount 40 as shown FIG. 15. The movement of the lens holder 50 within the bore 42 in the longitudinal direction shown by an arrow A in FIG. 15 changes the position of the focal point of the laser beam within the reading area in front of the bar code reader. Changing the position of the focal point adjusts the diameter of the laser beam within the reading area. The adjustment of the lens beam diameter is a critical issue since the diameter is the factor which defines the capability of reading a bar code (resolution for reading). The smaller the diameter, within an appropriate range, the narrower the bars of a bar code which can be read. The VLD module 15 comprises the lens holder as means for shaping the laser beam separately from the mount 40, which facilitates the adjustment of the diameter of the laser beam.

Figure 16A:
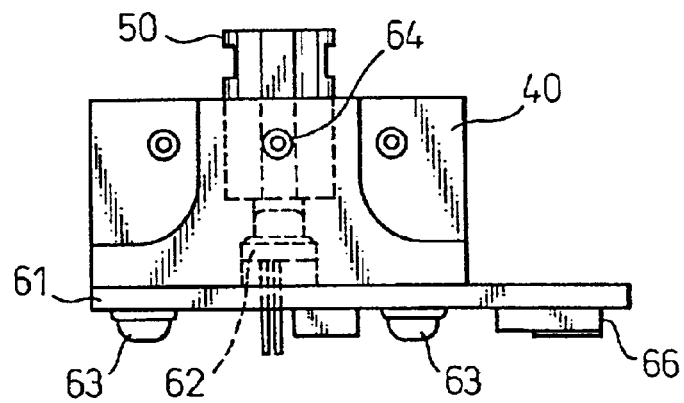
FIGS. 16A to 16C are front, plan and side views of the mount, lens holder and a circuit board which are assembled.
Figure 16B:
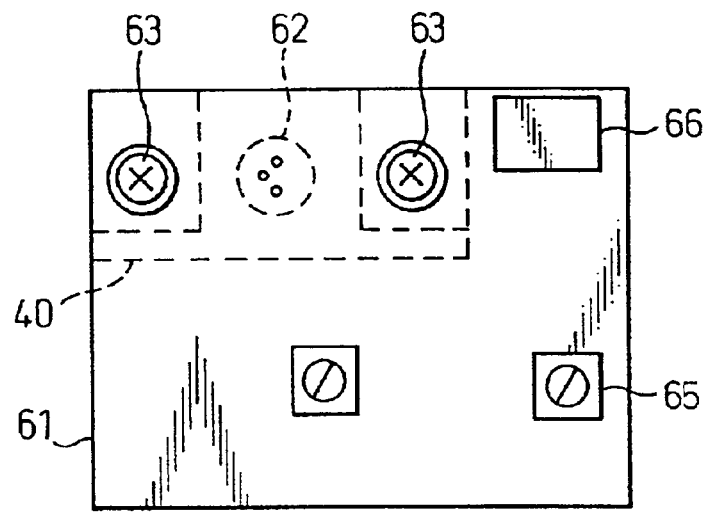
Figure 16C:
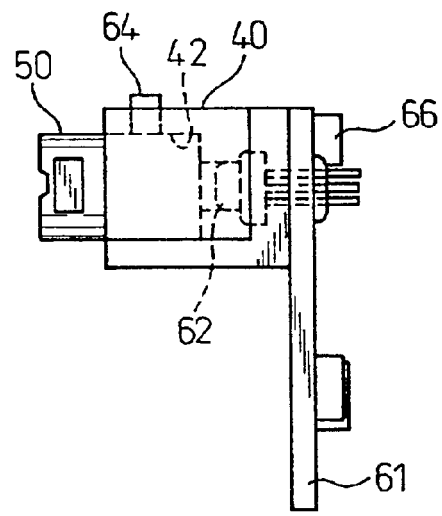

With reference to FIGS. 16A to 16C, a circuit board 61 is attached to the mount 40 by the pair of screws 63 threaded into the holes 41b of the mount 40. The circuit board 61 includes a laser diode 62 secured to the circuit board 61, and a driver circuit (not shown) for driving the diode laser 62.

The circuit board 61 is attached to the mount 40 so that the optical axis of the beam from the laser diode 62 is aligned with that of the lens holder 50, in particular, that of the aperture 53a and the lens 54 held by the lens holder 50.

A laser diode has a characteristic that the power of the emitted beam is not uniform from one to the other. Thus, a variable resistor 65 is provided for adjustment of the beam power emitted from the laser diode 62 so that the fluctuation in capability of reading between the scanners decreases.

A connector 66, for connecting the laser diode 62 to a power source, is also provided on the circuit board 61.

Figure 17:
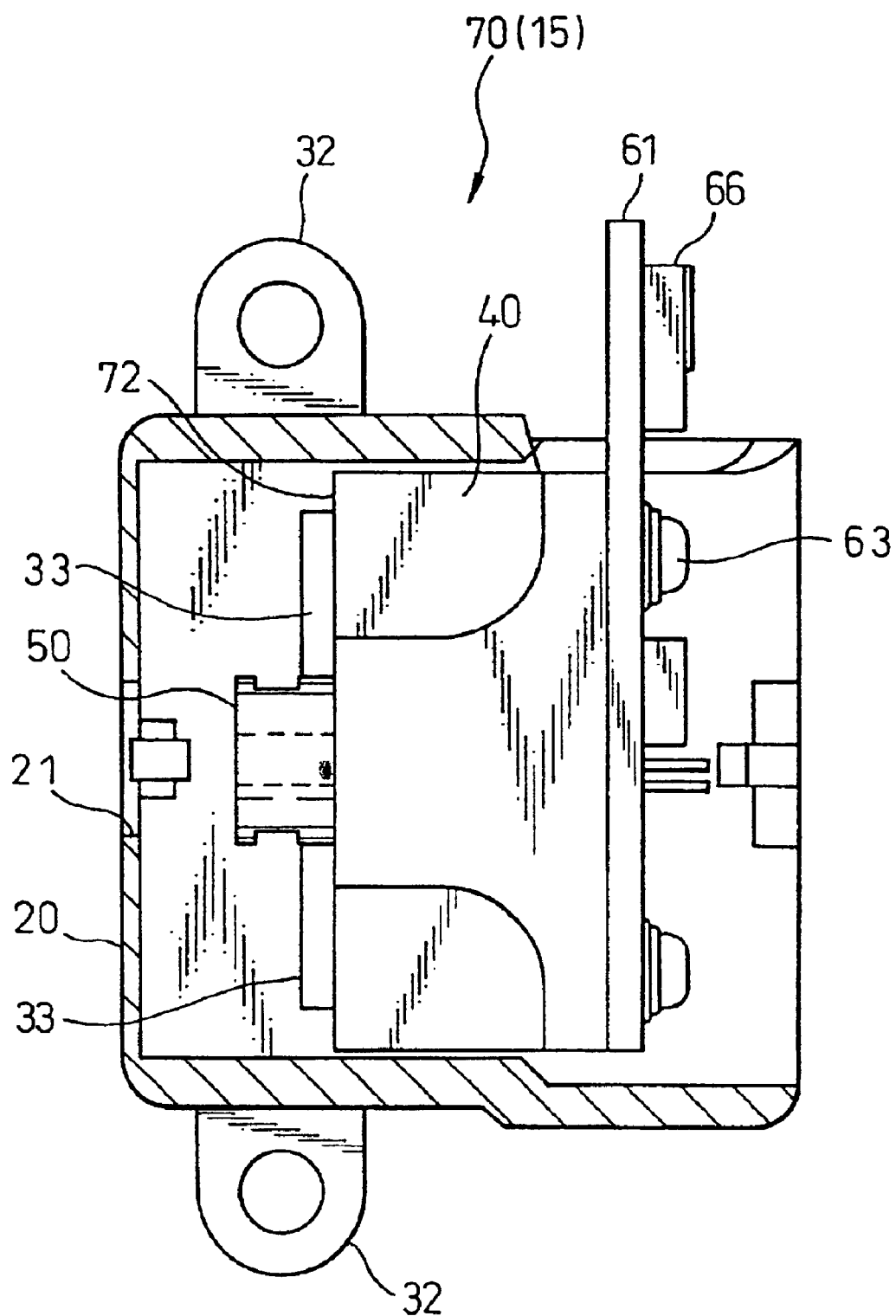
FIG. 17 is a front section of the VLD module.
Figure 18:
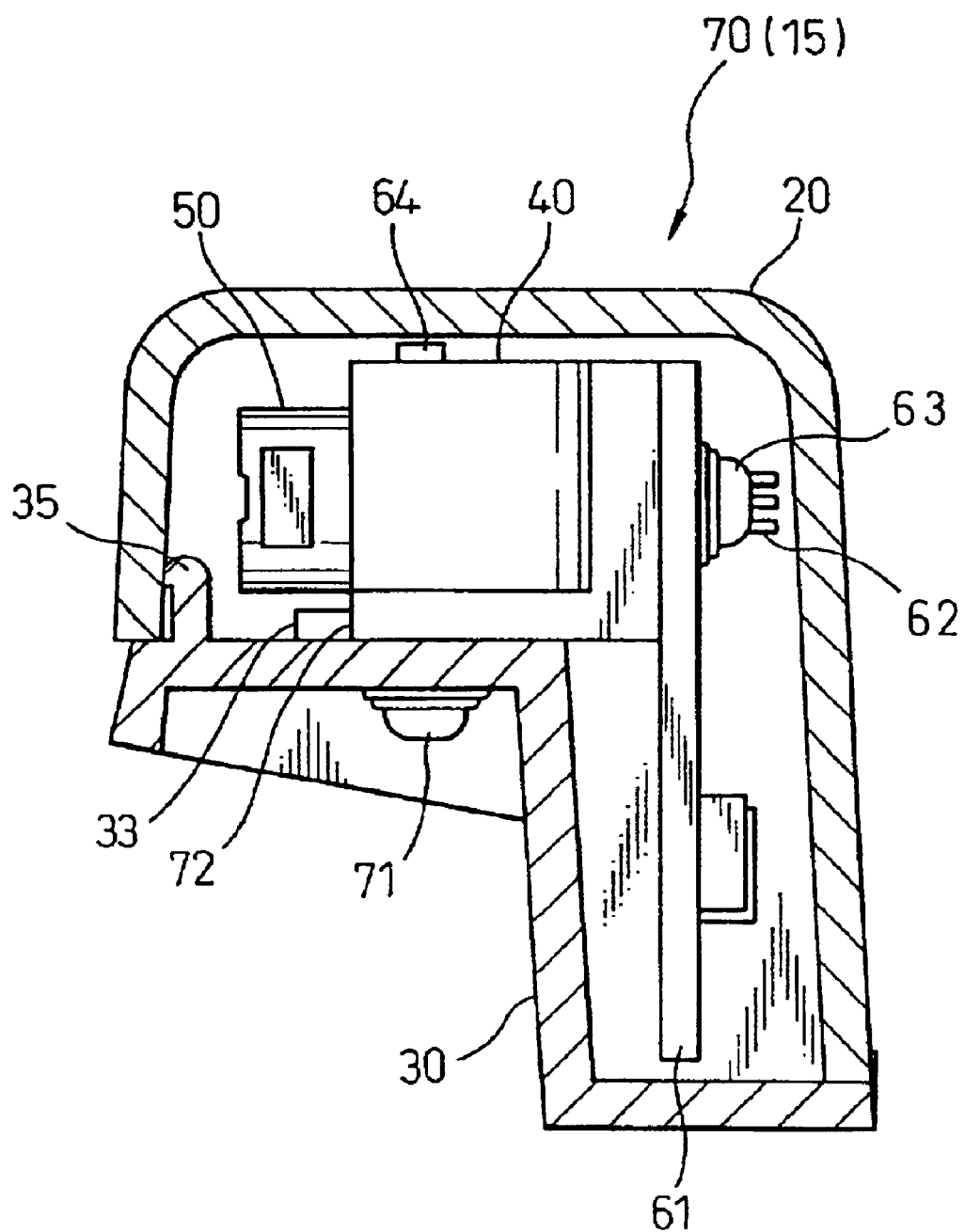
FIG. 18 is a side section of the VLD module.

With reference to FIGS. 17 and 18, the circuit board 61, except for the connector 66, the mount 40 and the lens holder 50 are contained within the housing 20 and 30 to provide the VLD module 15. The mount 40 is disposed on the cover 30 in place by the fitting between the recess 45 (FIG. 10) provided in the mount 40 and the ridged portion 33 on the top surface of the base 31 of the cover 30. The mount 40 is secured to the cover 30 by screws 71 which are inserted into the through holes 34 of the cover 30 and threaded into the threaded holes 41a of the mount 40. Thus, the laser diode 62 is disposed relative to the mount 40 and the lens holder 50.

The laser diode 62 is contained within the housing 20 and 30 which are made of molded resin, such as ABS (acrylonitrile-butadien-styrene) resin. Thus, the effect of external static electricity on the laser diode is reduced so that the possibility of damage to the laser diode is reduced during the replacement of the VLD module and the reliability of the VLD module is increased.

Further, the lens holder is also contained within the housing 20 and 30 to reduce an external force on the lens holder. This feature of the invention is advantageous in that the lens holder does not move during the replacement of the VLD module 15, which prevents a change in the diameter of the laser beam.

Figure 19:
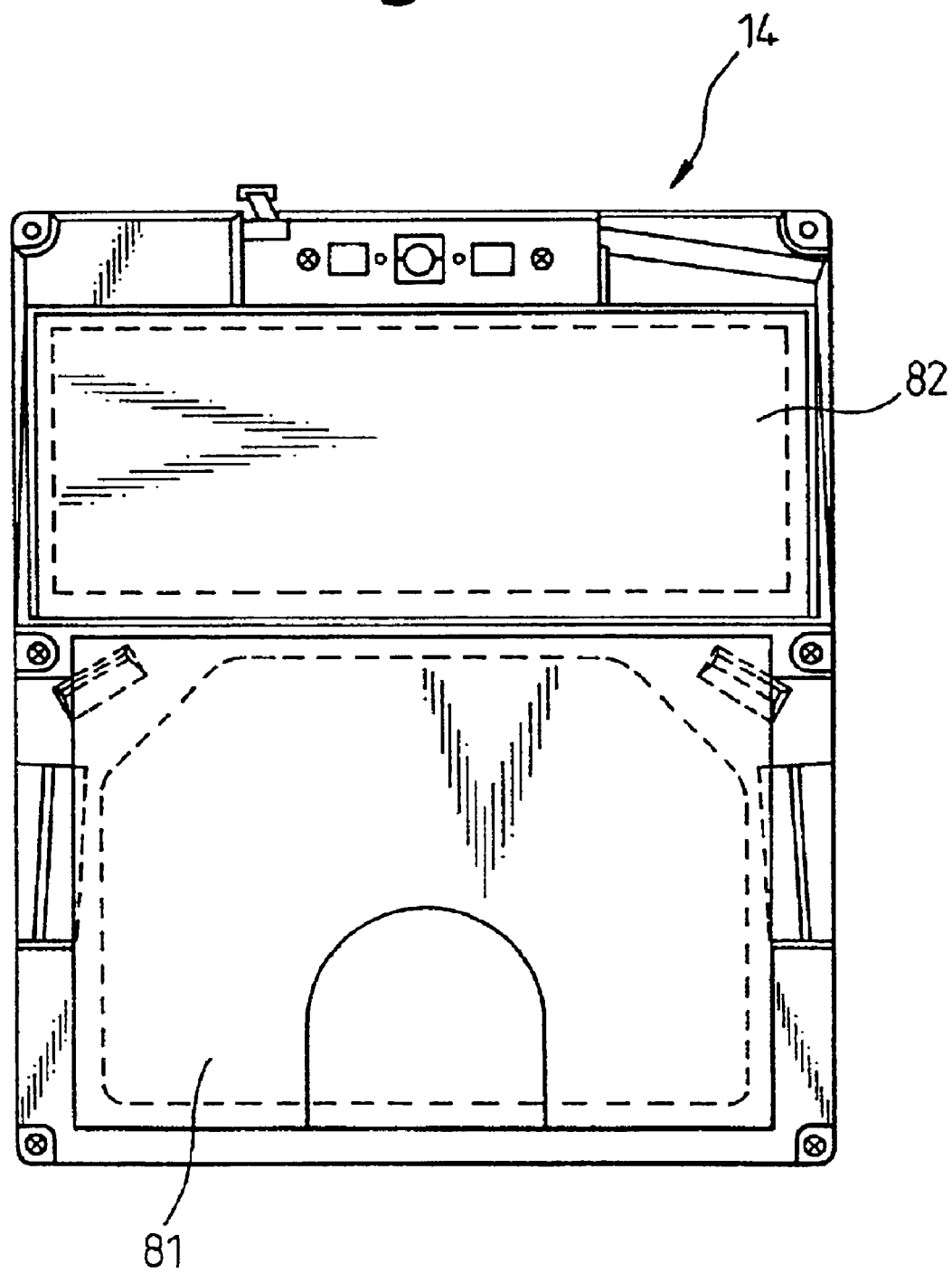
FIG. 19 is a front view of an optical unit of the bar code reader.
Figure 21:
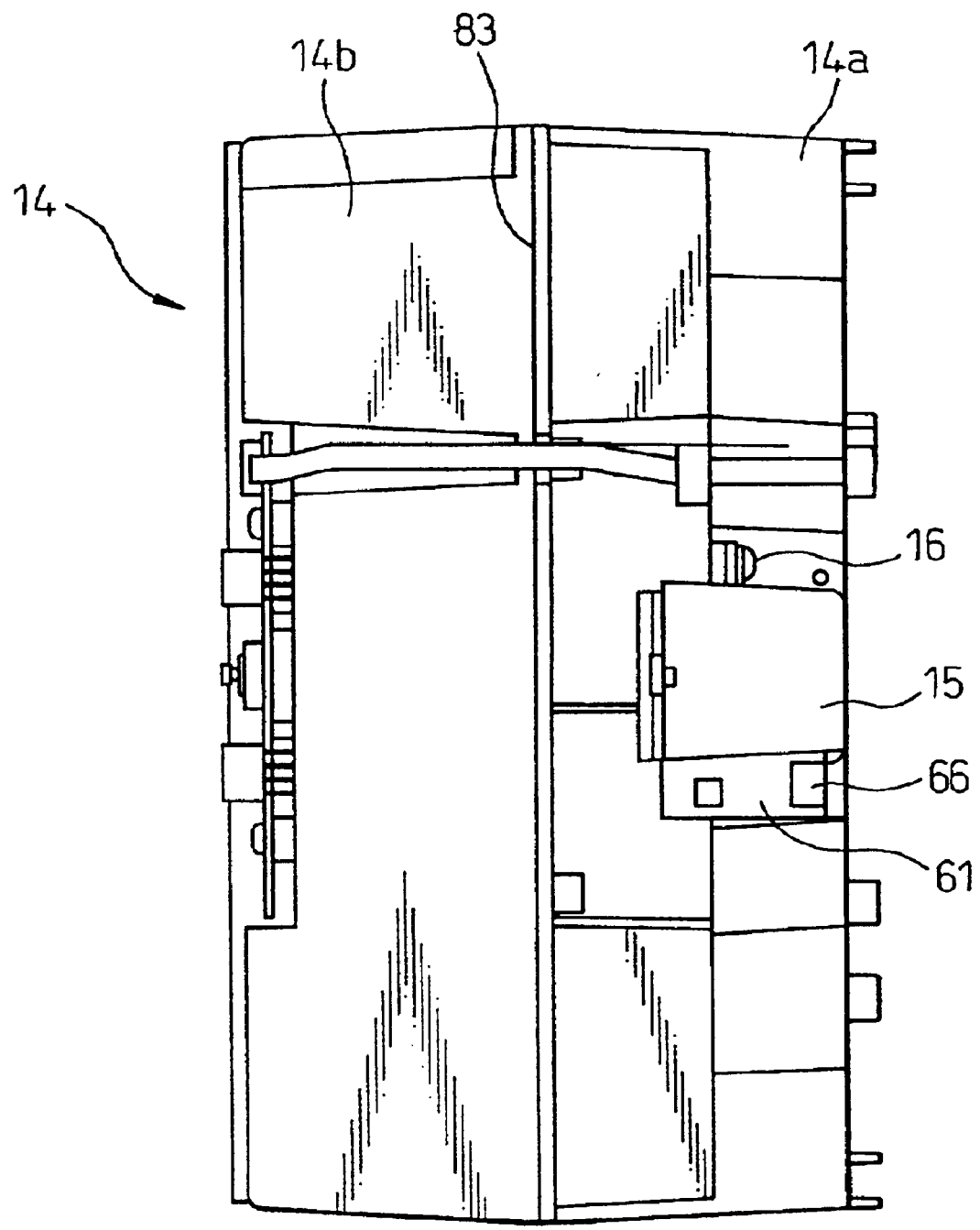
FIG. 21 is top view of the optical unit of FIG. 19.

With reference to FIGS. 19 to 21, the optical unit 14 includes a housing portion 14a and cover 14b which are connected to each other to provide a housing of the optical unil 14. In particular, the housing portion 14a and the cover 14b are sealingly connected at line 83 so that dust or small particles cannot enter therethrough. The cover 14b includes first and second openings 11 and 12 which are sealingly and transparently covered by first and second glass plates 81 and 82, respectively. In this embodiment, first and second scanning beams propagate through the first and second glass plates 81 and 82, respectively.

The VLD module 15 is secured to the top of the housing portion 14a of the optical unit 14 by screws 16 (FIGS. 19 and 20). The damper 17 between the VLD module 15 and optical unit 14 (FIG. 20) prevents dust from entering the optical unit 14 through a possible gap therebetween, and prevents vibration of the scanner from being transmitted to the VLD module 15.

Figure 22:
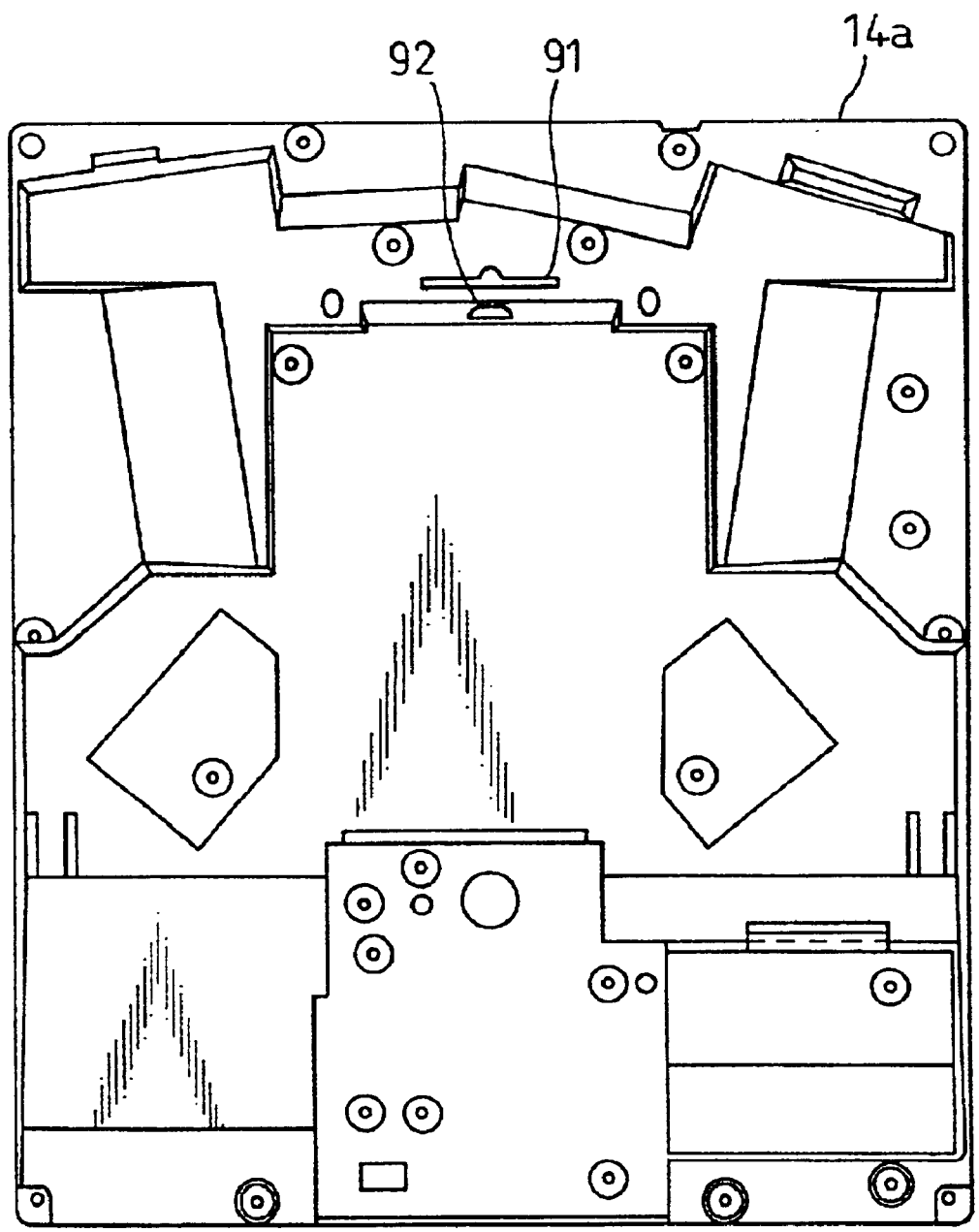
FIG. 22 is a back view of a housing of the optical unit of FIG. 19.

With reference to FIG. 22, provided on the back wall of the housing portion 14a is a horizontal protrusion 91 for positioning the VLD module 15. Adjacent to the horizontal protrusion 91, an aperture 92 (FIGS. 25 and 26) is provided through the outer wall to open into inside of the housing of the optical unit 14. An aperture 95 (FIG. 23) is provided through the condensing concave mirror 94 at the center thereof-so that the apertures 92 and 95 provide a passage through which the laser beam propagates from the VLD module 15, which is mounted to the housing portion 14a of the optical unit 14, to the polygon mirror 95.

In this particular embodiment, the aperture 92 is closed by a glass plate 92a (FIG. 24) which is attached to the inner surface of the housing portion 14a. In particular, the glass plate 92a is obliquely provided relative to the optical axis of the VLD module 15 to prevent total reflection of the laser beam at the glass plate. In another embodiment of the invention, the aperture 92 may not be closed by the glass plate 92a since the damper 71 prevents dust from entering.

With reference to FIG. 23, the laser beam entering the optical unit 14 through the apertures 92 and 95 is reflected by the rotating polygon mirror 93, which includes four mirrors in this embodiment, so that the beam scans the mirrors 96a to 96h. The scanning beam from the polygon mirror 93 is divided into a set of scanning beam segments when the beam scans the respective mirrors 96a to 96b so that a set of scanning lines are provided outside of the scanner. In this context, the mirrors 96a to 96h are referred to as beam dividing mirrors in this specification. In particular, according to the embodiment, the dividing mirrors 96a to 96h are oriented to produce first and second sets of scanning lines outside of the scanner through the first and second openings 11 and 12, respectively. Another set of beam dividing mirrors may be provided and attached to the cover 14b.

The scanning beam is diffusely reflected by a bar code. A portion of each reflected beam returns along the coincident light path of the emitted beam. Thus, the return beam is reflected by the polygon mirror 93 toward the aperture 95 which is provided through the concave mirror 94 for condensing the return beam onto the optical sensor 98. The optical sensor 98 generates an electrical signal corresponding to the return beam to a signal processor (not shown).

As mentioned above, the laser diode 62 is directly oriented to the polygon mirror 93 without a additional small mirror which is often provided around the concave mirror in some scanners of the prior art. Thus, according to the invention, positioning between the laser source 63, additional mirror, and the polygon mirror 93 is not necessary.

Figure 24:
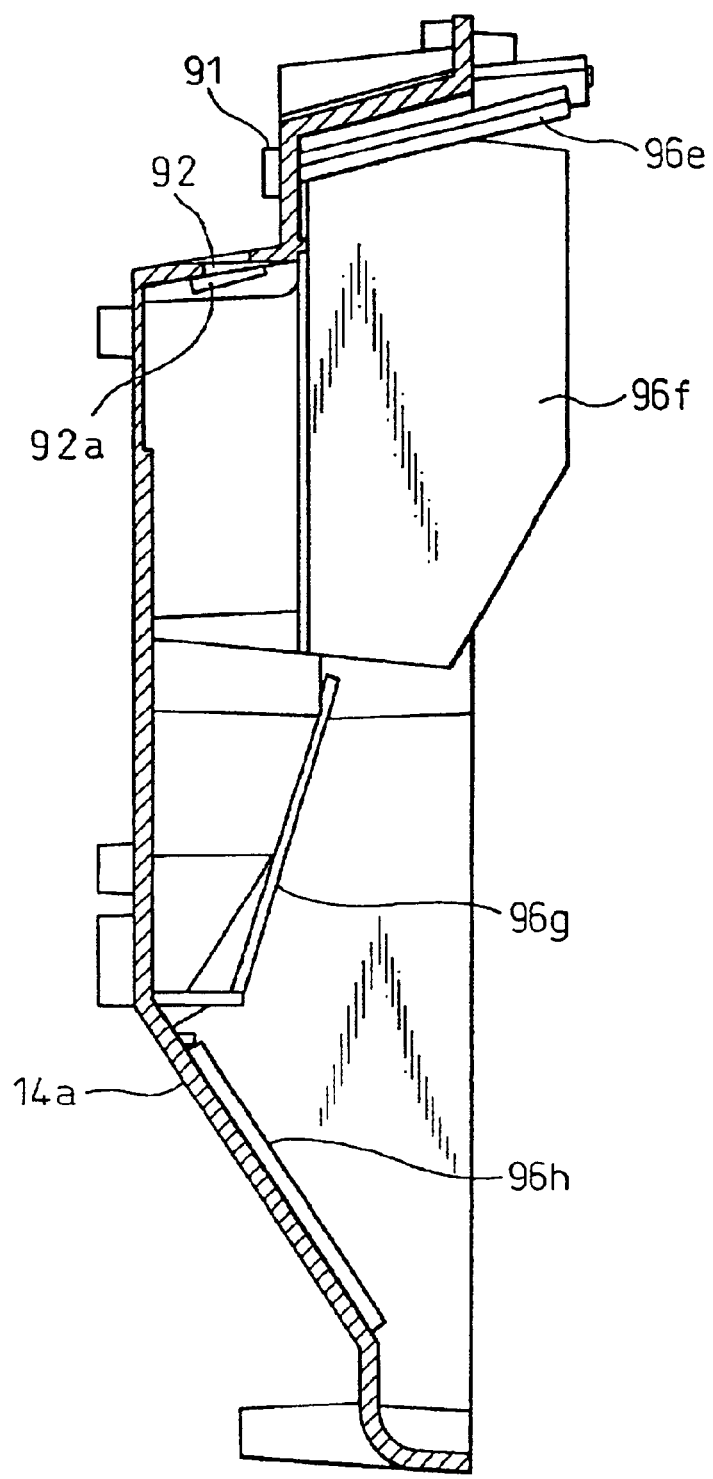
FIG. 24 is a side section of the housing of the optical unit of FIG. 19.

The aperture 92 is obliquely formed in the housing portion 14a as shown in FIG. 24 so that the laser beam runs to the polygon mirror 93 along a line which slants from vertical line. The polygon mirror 93 reflects the beam vertically toward the dividing mirrors 96a to 96h.

Figure 25:
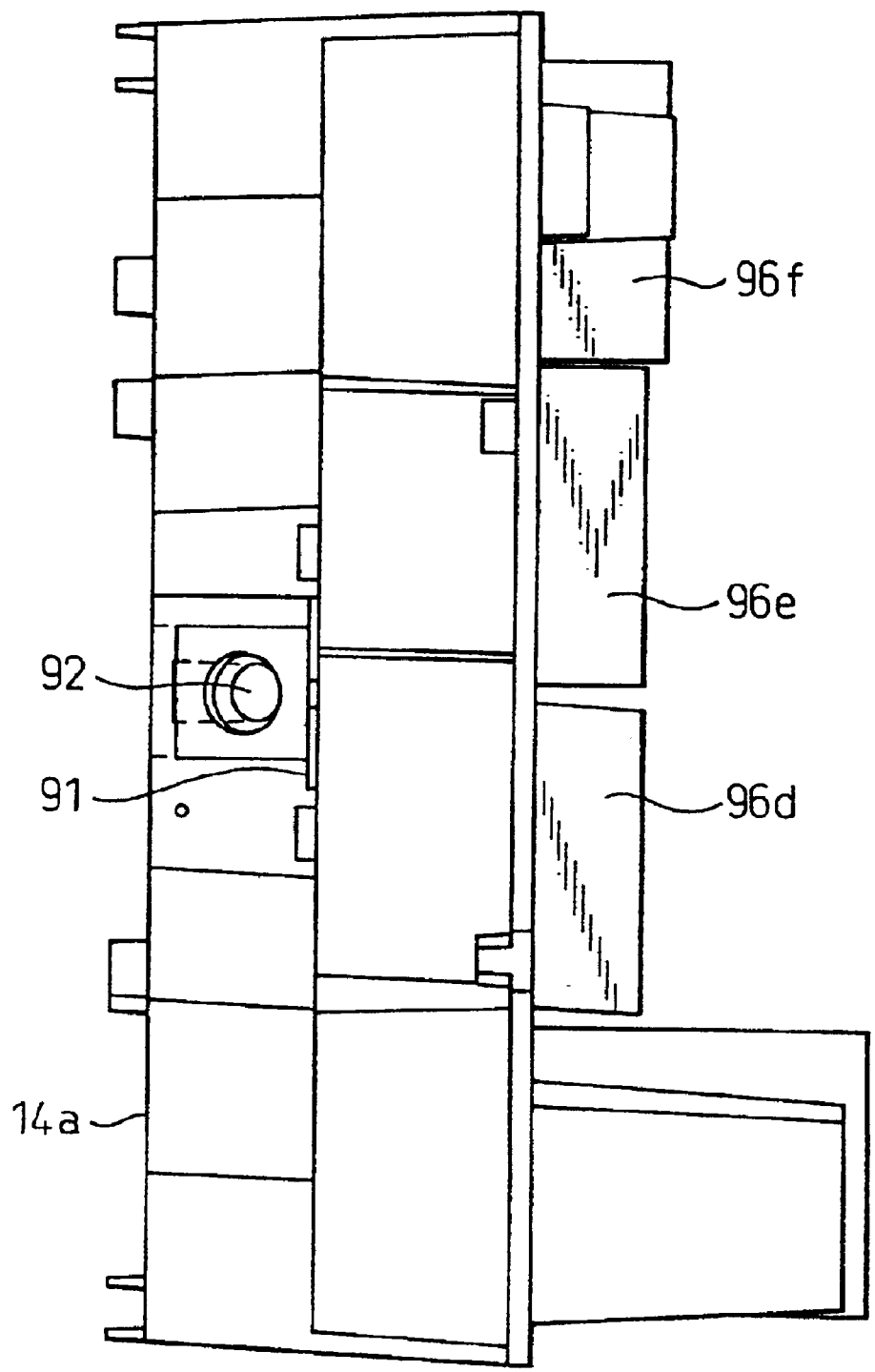
FIG. 25 is a top view of the housing of the optical unit of FIG. 19.
Figure 26:
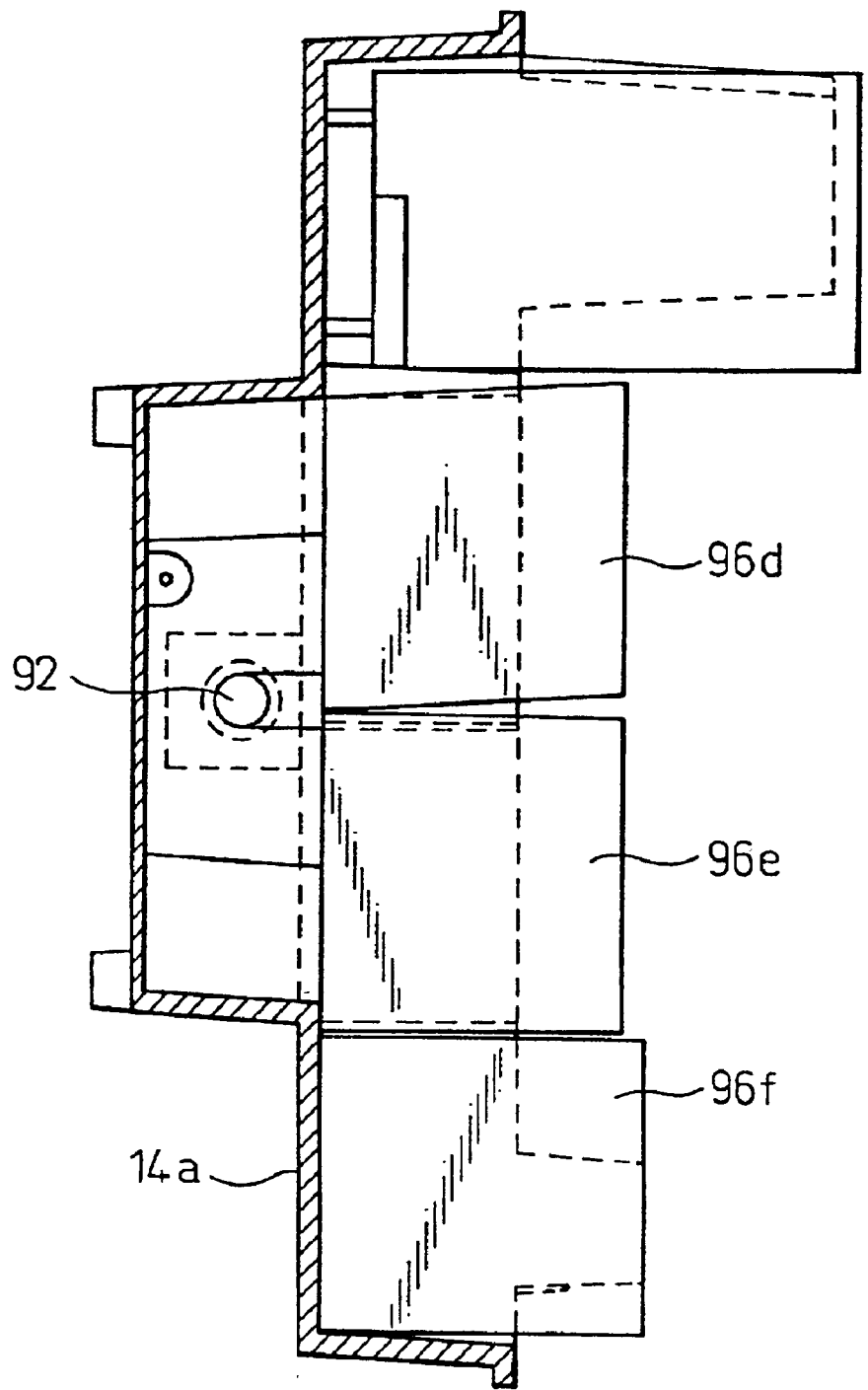
FIG. 26 is a section of the housing of the optical unit of FIG. 19.

FIGS. 25 and 26 show a top and sectional views of the housing portion 14a, respectively, to which the VLD module 15 is mounted. The aperture 92 is provided substantially at the center of the housing portion 14a.

Figure 27:
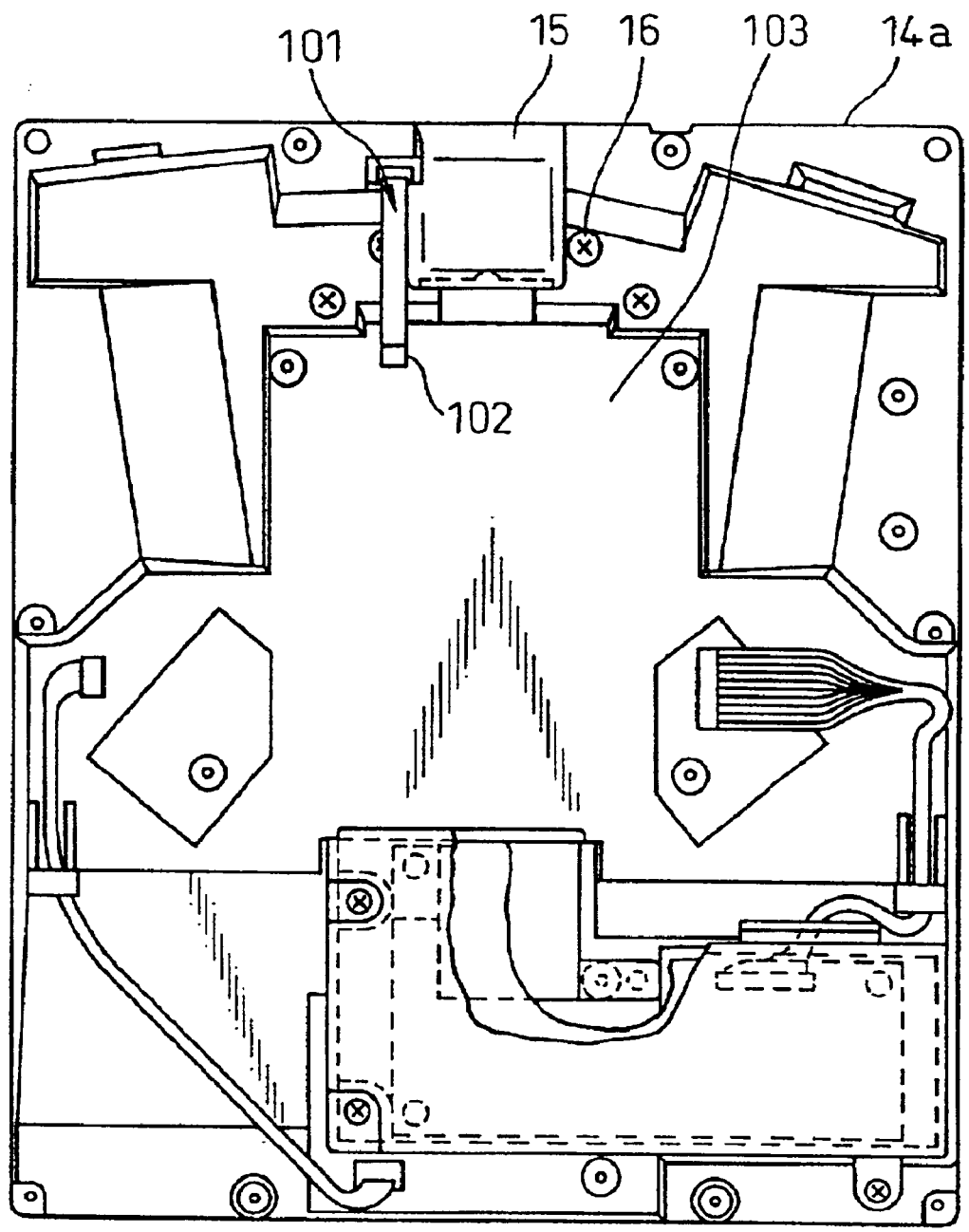
FIG. 27 is back view of the optical unit of FIG. 19, illustrating a recess for receiving a circuit board.

With reference to FIG. 27, the housing portion 14a has a recess 103 on the outside surface of the back wall thereof. The recess 103 accommodates a control circuit board (not shown) for controlling the operation of the scanner. The circuit board 61 of the VLD module 15 is connected to the control circuit board by a flat cable 101.

Figure 28:
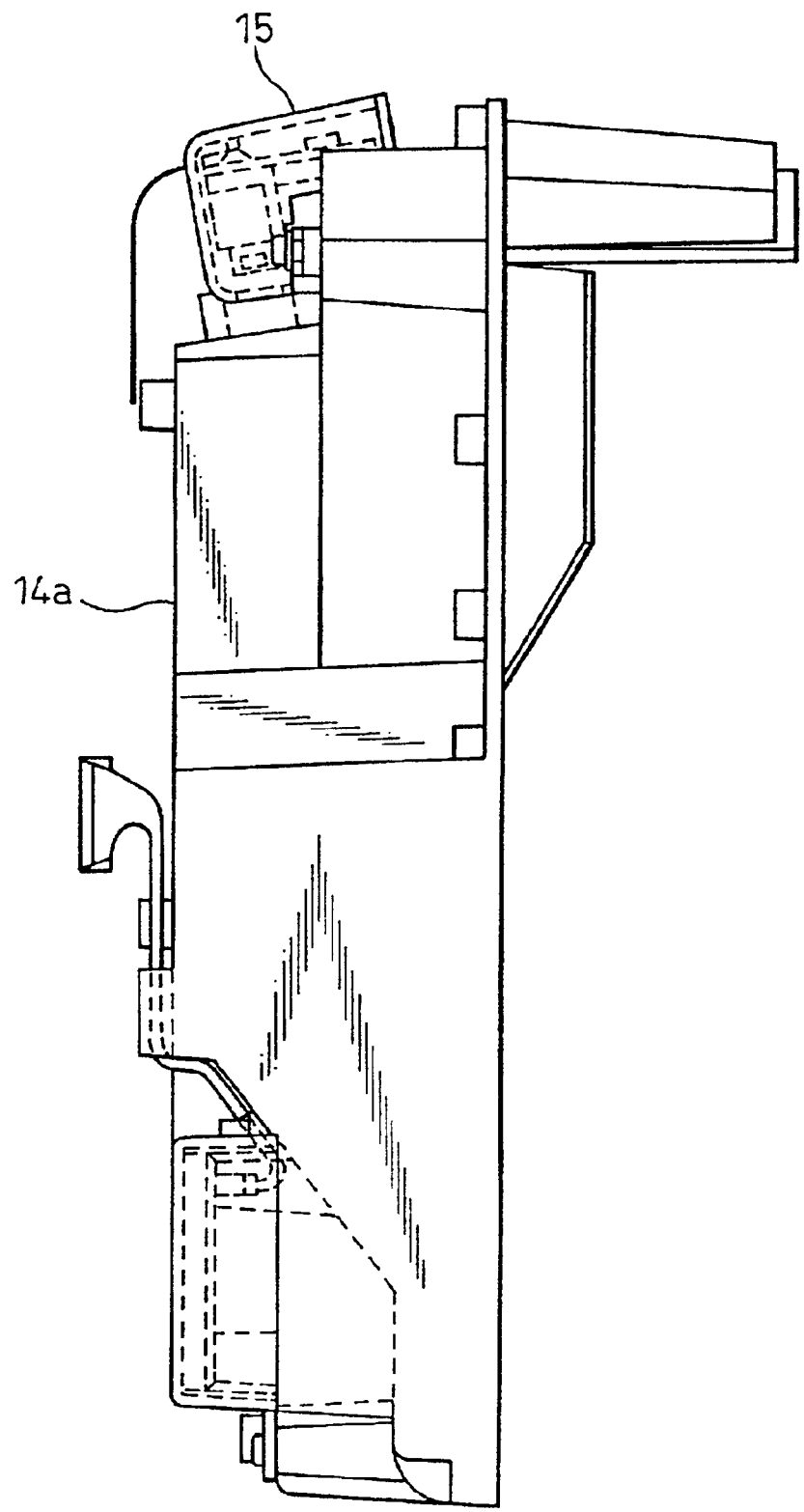
FIG. 28 is a side view of the housing of the optical unit, illustrating the VLD module mounted to the housing.
Figure 29:
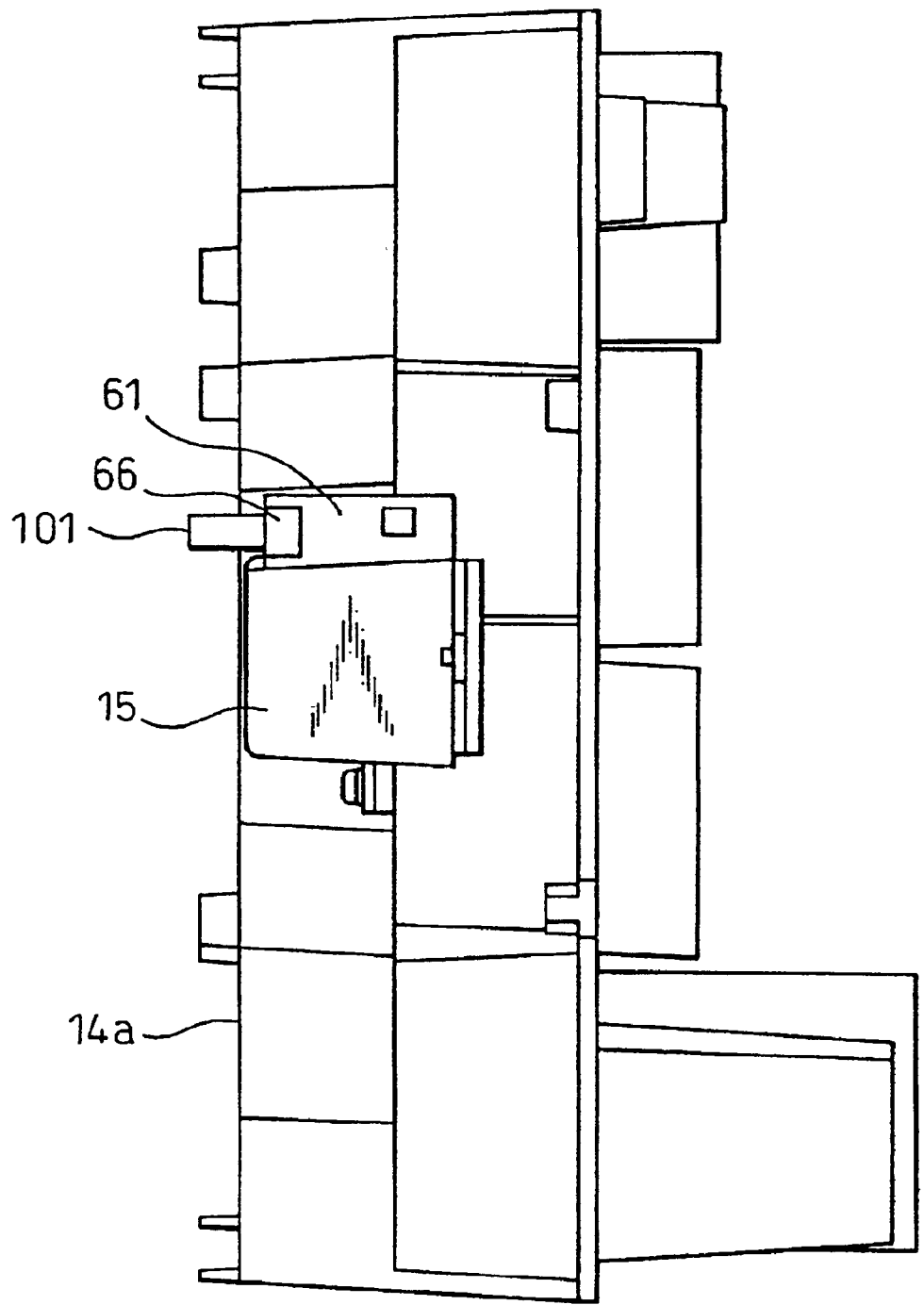
FIG. 29 is a top view of the housing of the optical unit, illustrating the VLD module mounted to the housing.

FIGS. 28 and 29 are a side and top views of the housing portion 14a. The control circuit board and the VLD module cannot be directly connected to each other since the surface including the recess 103 to which the control circuit board is mounted and the surface to which the VLD module 15 is mounted are substantially perpendicular to each other as shown in FIGS. 28 and 29. Therefore, the control circuit board and the VLD module 15 are connected through the flat cable 101. The provision of the connector 66 outside of the housing 20 and 30 facilitates the attachment of the flat cable 101 to the connector 66.

With reference to FIG. 29, one end of the flat cable 101 is connected to the connector 66 and the other end 102 is connected to the control circuit board.

Figure 30:
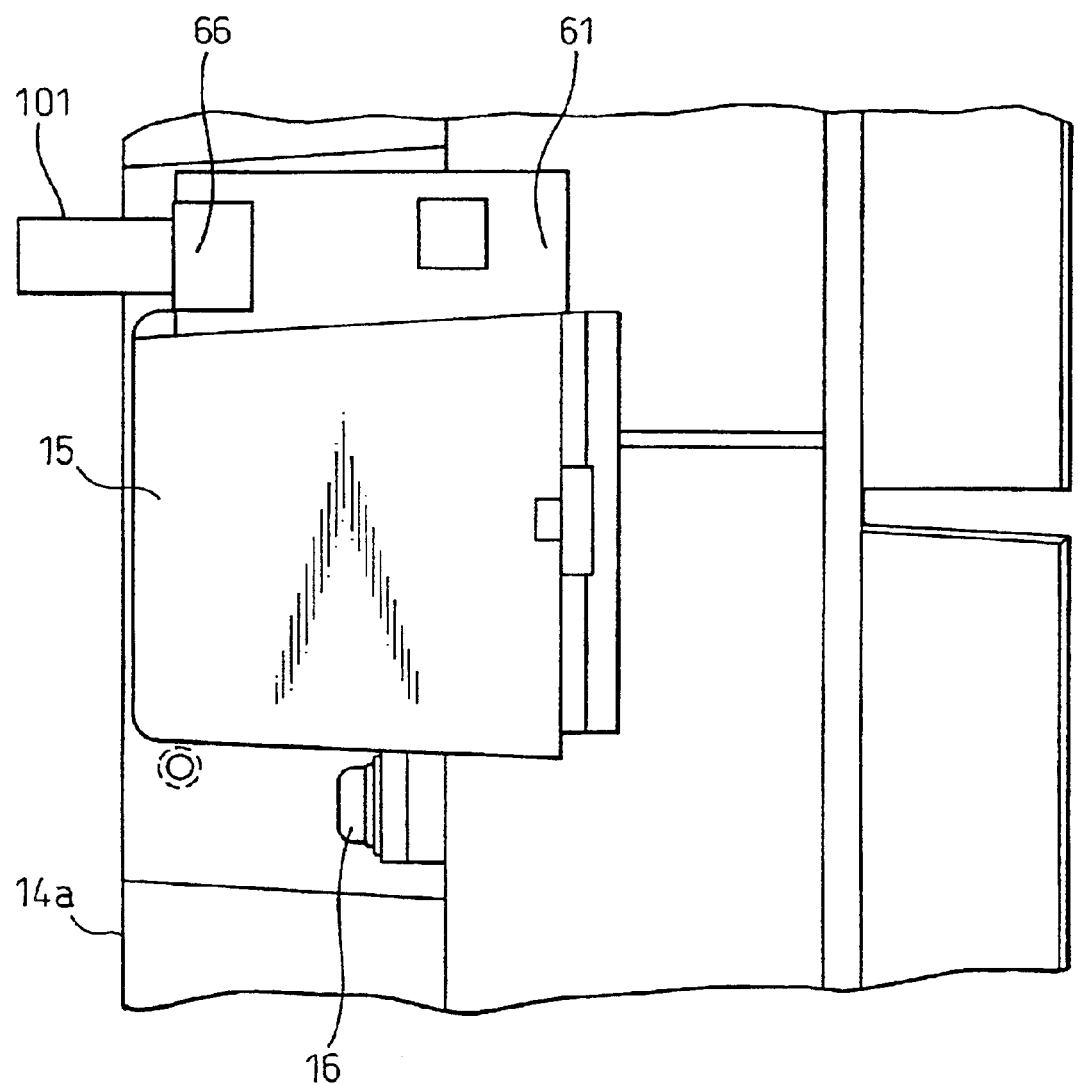
FIG. 30 is an enlarged top view of the VLD module mounted to the housing.
Figure 31:
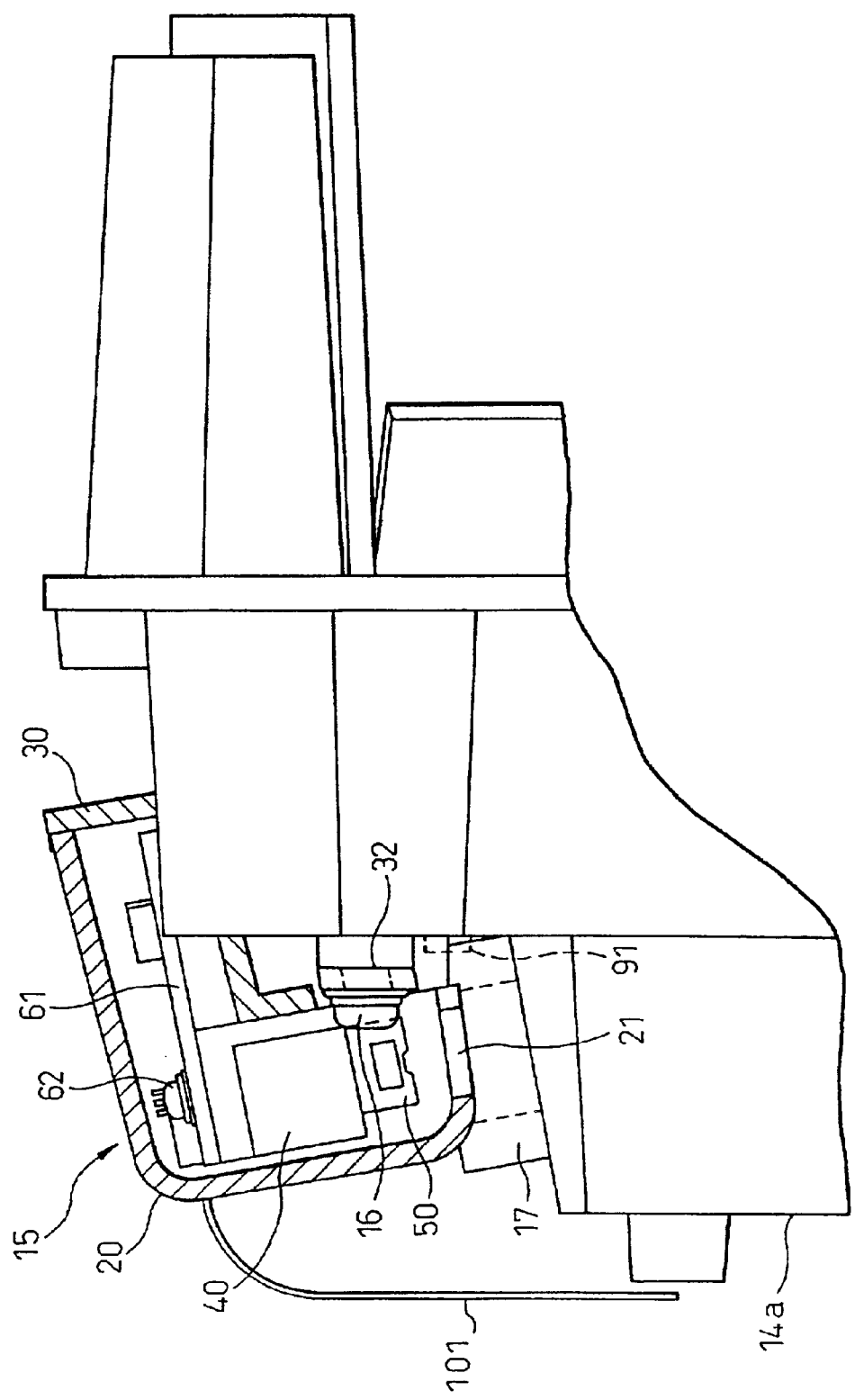
FIG. 31 is an enlarged section of the VLD module mounted to the housing.
Figure 32:
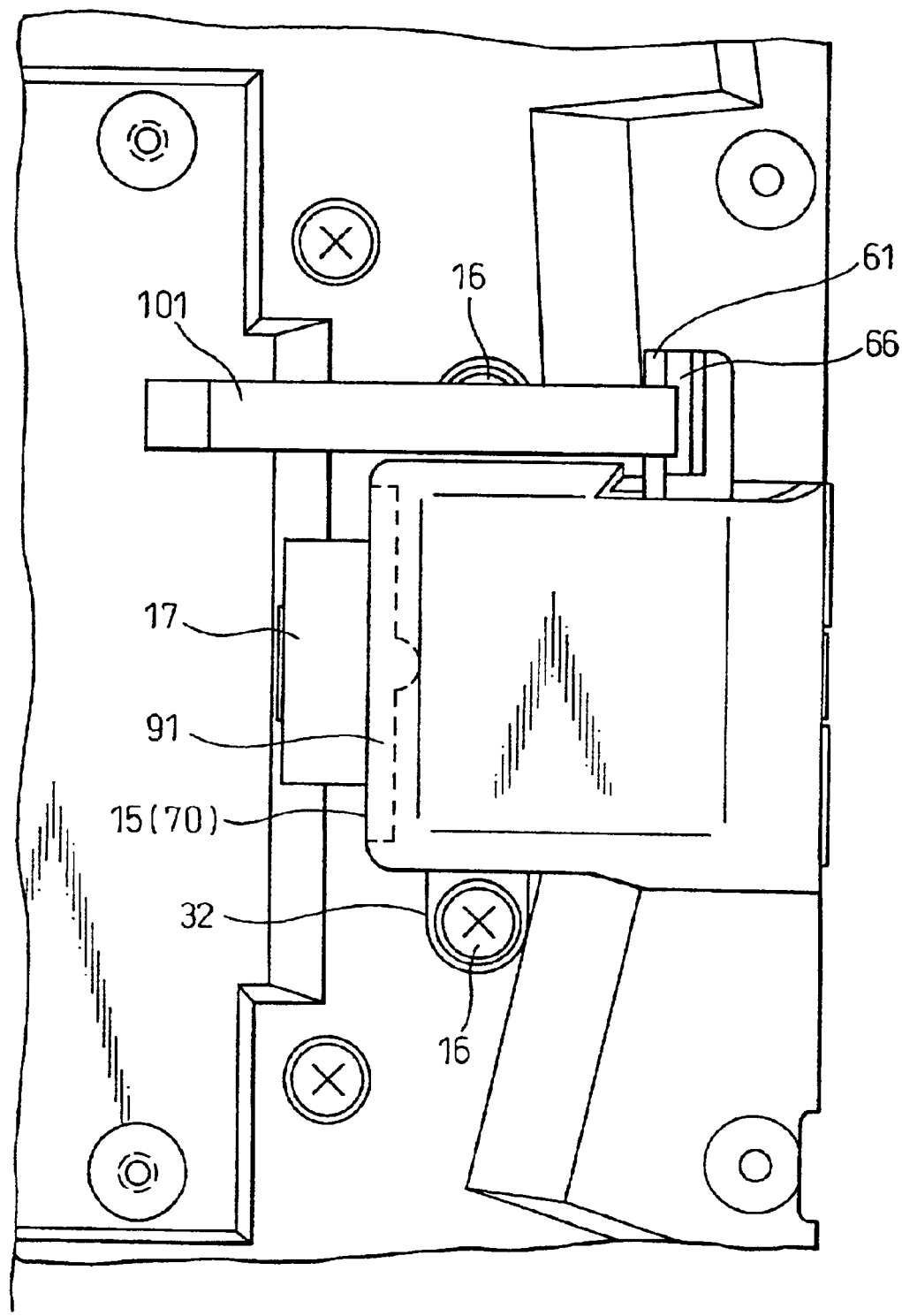
FIG. 32 is an enlarged back view of the VLD module mounted to the housing.

FIGS. 30 to 32 show enlarged details of the VLD module 15 mounted to the housing portion 14a. The VLD module 15 emits the laser beam as shown by an arrow B as shown FIG. 31. The damper 17 includes a passage 17a along which allow B which allows the laser beam propagates through the damper into the aperture 92.

As mentioned in the description of the prior art, according to the prior art, a VLD module is provided within the optical unit 14. Thus, the VLD module must be formed as small as possible. For this purpose, the VLD module includes a laser diode only included in a housing, and necessary electrical circuits, such as an electric voltage transformer, a driver circuit and an output control circuit, are provided outside of the VLD module.

Figure 33:
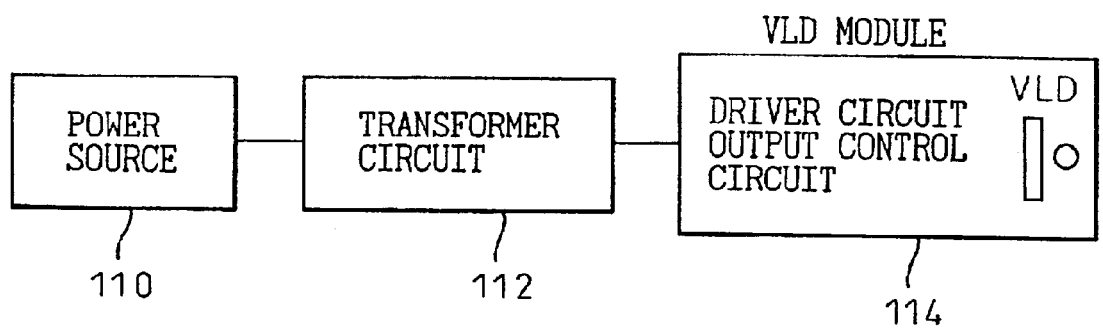
FIG. 33 is a block diagram relative to the VLD module of the present invention.
Figure 34:
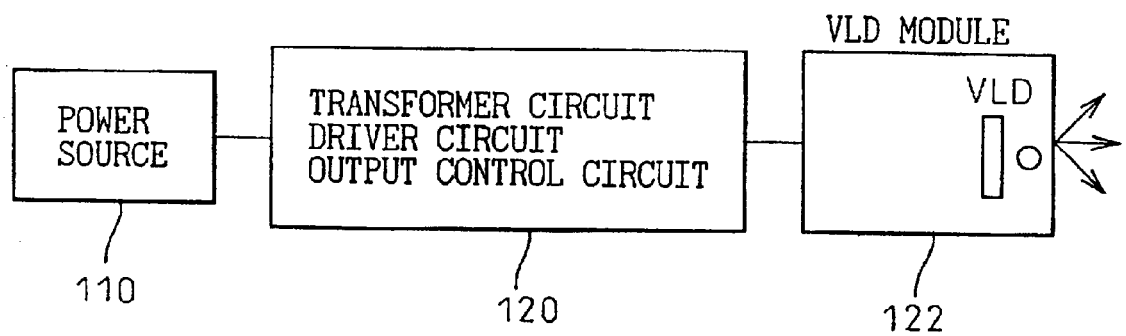
FIG. 34 is a block diagram similar to FIG. 33 according to the prior art.

FIGS. 33 and 34 show a block diagram for electrical circuit for the VLD module according to the invention and the prior art, respectively. According to the prior art, electric power is supplied to the laser diode (VLD) from a power source 110, such as a commercial electric line, through a transformer circuit, a driver circuit and output control circuit for the laser diode which are provided on a board 120 separate from a VLD module 122 as shown in FIG. 34. According to the present invention, a driver circuit and a output control circuit are provided on an additional board 114, which also corresponds to the circuit board 61, separate from a board for a transformer circuit 112 (FIG. 33). The circuit board 61 is contained within the housing 20 and 30 to provide the VLD module 15.

As mentioned above, a laser diode has a characteristics that the power of the emitted beam relative to the input electric current is not uniform from one to the other. According to the prior art, the driver and output control circuits are separately provided from the VLD module. Therefore, the output of the laser diode must be adjusted through the adjustment of the input electric current by the variable resistor 65 and must be carried out wherever the VLD module 15 is replaced. On the other hand, according to the invention, the VLD module 15 includes the driver and output control circuits in the VLD module 15. Thus the adjustment of the output of the laser diode 62 can be carried out in a factory whereby the work and time for maintenance is reduced.

It will also be understood by those skilled in the art that the forgoing description is a preferred embodiment of the disclosed device and that various changes and modifications may be made without departing from the spirit and scope of the invention.

We claim:

1. A scanning apparatus comprising:
a light source module including a laser diode for emitting a laser beam, a circuit board comprising said laser diode, a driving circuit for said laser diode, and a connector for receiving a power supply for driving said laser diode from an electric power source, means for shaping the laser beam emitted by said laser diode and a first housing made of electrically insulating material for containing said beam shaping means and said circuit board except for a portion of said circuit board where the connector is mounted;
an optical unit including a second housing sealingly containing therein means for receiving a beam from the light source module and reflecting the beam to provide the scanning beam, means for reflecting the scanning beam to provide a plurality of scanning lines outside of the second housing, means for receiving a return beam reflected by an article; and
the first housing being removably mounted to the exterior of the second housing and the first and second housings having respective windowed apertures through which the beam passes, from the interior of the first housing to the interior of the second housing.

2. The scanning apparatus according to claim 1, further comprising a damper member of resilient material provided between the optical unit and the light source module to prevent dust from entering the second housing.

3. The scanning apparatus according to claim 2, wherein a glass plate is provided to close the aperture in the second housing through which the beam enters the second housing from the light source module.

4. The scanner according to claim 1, wherein the optical unit comprises a scanning mirror producing a scanning beam, a plurality of mirrors reflecting the scanning beam and dividing the scanning beam into a set of scanning beam segments, and an optical receiver element receiving the return beam reflected by a bar code to produce an electrical signal responsive to the return beam, the second housing enclosing the scanning mirror, the plurality of mirrors, and the optical receiver element, the one or more second apertures comprising one or more openings through which set of scanning beam segments propagate outside of the second housing to provide a set of scanning lines outside of the scanner; and
the light source module removably secured to the exterior of the second housing to direct the emitted light beam to the scanning mirror through the respective first and second aperture of the first and second housings.

5. The scanner according to claim 4, in which the scanner mirror is a rotating polygonal mirror.

6. A scanner for emitting a scanning beam, comprising:
a light source module including a laser diode for emitting a laser beam, a circuit board comprising said laser diode, a driving circuit for said laser diode, and a connector for receiving a power supply for driving said laser diode from an electric power source, means for shaping the laser beam emitted by said laser diode, and a first housing made of electrically insulating material for containing said beam shaping means and said circuit board except for a portion of said circuit board where the connector is mounted and having a first aperture through which the laser beam passes to the exterior of the first housing;

an optical unit including an optical element for receiving the light beam form the light source module and for producing a scanning beam, and a second housing for enclosing the optical element, the second housing including one or more second apertures through which the light beam from the light source module enters the second housing and through which a reflected light beam passes into the second housing; and the light source module being mounted to the exterior of the housing of the optical unit with respective first and second apertures aligned to direct the beam from the light source module to the optical elements within the second housing the optical unit.

7. The scanner according to claim 6, wherein the optical unit comprises a scanning mirror producing a scanning beam, a plurality of mirrors reflecting the scanning beam and dividing the scanning beam into first and second sets of scanning beam segments, an optical receiver element receiving the return beam reflected by a bar code to produce an electrical signal responsive to the return beam, the second housing enclosing the scanning mirror, the plurality of mirrors, and the optical receiver element, the one or more second apertures comprising first and second openings through which first and second sets of scanning beam segments propagate outside of the second housing to provide fist and second sets of scanning lines outside of the scanner; and the light source module is removably secured to the exterior of the second housing to direct the emitted light beam to the scanning mirror through the respective first and second apertures of the first and second housings.

8. The scanner according to claim 7, in which the scanner mirror is a rotating polygonal mirror.

9. A bar code scanner for reading a bar code, comprising:

a light source module including a laser diode emitting a laser beam, a circuit board comprising said laser diode, a driving circuit for said laser diode, and a connector receiving a power supply for driving said laser diode from an electric power source means for shaping the laser beam emitted by said laser diode and a first housing made of electrically insulating material containing said beam shaping means and said circuit board except for a portion of said circuit board where the connector is mounted;

an optical unit including a scanning mirror for-producing a scanning beam, a plurality of mirrors reflecting the scanning beam and dividing the scanning beam into first and second sets of scanning beam segments, an optical receiver element receiving a return beam reflected by a bar code to produce an electrical signal responsive to the return beam, and a second housing enclosing the scanning mirror, the plurality of mirrors, and the optical receiver element, the second housing including an aperture through which the beam from the light source module enters into the second housing and first and second openings through which the first and second sets of scanning beam segments propagate outside of the second housing to provide first and second sets of scanning lines outside of the scanner; and the light source module being secured to the exterior of the second housing a position directing the light beam through the aperture and to the scanner mirror in the second housing.

10. The bar code scanner according to claim 9, in which the scanner mirror is a rotating polygonal mirror.

* * * * *

UNITED STATES PATENT AND TRADEMARK OFFICE
CERTIFICATE OF CORRECTION

PATENT NO. : 6,840,452 B2
DATED : January 11, 2005
INVENTOR(S) : Masanori Ohkawa et al.

It is certified that error appears in the above-identified patent and that said Letters Patent is hereby corrected as shown below:

Title page,
Item [75], Inventors, change "Watanuk" to -- Watanuki --.

Column 10,
Line 46, insert -- is -- after "module".
Line 49, change "aperature" to -- aperatures --.

Column 11,
Line 13, insert -- of -- after "housing".
Line 18, insert -- and -- after "segments,"

Column 12,
Line 12, delete "for-"
Line 29, insert -- in -- after "housing"

Signed and Sealed this

Twenty-eighth Day of June, 2005

JON W. DUDAS
*Director of the United States Patent and Trademark Office*